US012646774B2

(12) United States Patent (10) Patent No.: US 12,646,774 B2

Hiraki et al. (45) Date of Patent: Jun. 2, 2026

(54) ADHESIVE FILM FOR METAL TERMINAL, METAL TERMINAL WITH ADHESIVE FILM, AND BATTERY

(71) Applicant: DAI NIPPON PRINTING CO., LTD., Tokyo (JP)

(72) Inventors: Kenta Hiraki, Tokyo (JP); Jun Tanaka, Tokyo (JP); Takahiro Kato, Tokyo (JP); Atsuko Takahagi, Tokyo (JP); Rikiya Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 1223 days.

(21) Appl. No.: 15/734,790

(22) PCT Filed: Jun. 20, 2019

(86) PCT No.: PCT/JP2019/024452

§ 371 (c)(1),
(2) Date: Dec. 3, 2020

(87) PCT Pub. No.: WO2019/244971

PCT Pub. Date: Dec. 26, 2019

(65) Prior Publication Data

US 2021/0234222 A1 Jul. 29, 2021

(30) Foreign Application Priority Data

Jun. 20, 2018 (JP) ................................. 2018-117404

(51) Int. Cl.
H01M 50/193 (2021.01)
C09J 123/12 (2006.01)
(Continued)

(52) U.S. Cl.
CPC ......... H01M 50/193 (2021.01); C09J 123/12 (2013.01); C09J 123/26 (2013.01);
(Continued)

(58) Field of Classification Search
CPC .. H01M 50/193; H01M 50/186; C09J 123/10; C09J 123/12; C09J 123/26;
(Continued)

(56) References Cited

U.S. PATENT DOCUMENTS

2008/0213659 A1 9/2008 Yamada
2013/0273386 A1 10/2013 Matsumoto et al.
(Continued)

FOREIGN PATENT DOCUMENTS

JP 2008-277238 A 11/2008
JP 2009-224218 A 10/2009
(Continued)

OTHER PUBLICATIONS

JP2016091939.*
(Continued)

*Primary Examiner* — Scott R. Walshon
(74) *Attorney, Agent, or Firm* — OLIFF PLC

(57) ABSTRACT

This adhesive film for a metal terminal is interposed between a metal terminal electrically connected to an electrode of a battery element and a wrapping material sealing the battery element and is provided with at least one resin layer having a polyolefin backbone. When the adhesive film for the metal terminal is measured with a differential scanning calorimeter, a melting peak is observed within the range of 120° C. to 156° C.

17 Claims, 5 Drawing Sheets

(51) Int. Cl.

| | | |
|---|---|---|
| *C09J 123/26* | (2006.01) | |
| *H01M 50/172* | (2021.01) | |
| *H01M 50/186* | (2021.01) | |
| *H01M 50/197* | (2021.01) | |
| *H01M 50/55* | (2021.01) | |
| *H01M 50/553* | (2021.01) | |
| *H01M 50/562* | (2021.01) | |

(52) U.S. Cl.

CPC ....... *H01M 50/172* (2021.01); *H01M 50/186* (2021.01); *H01M 50/197* (2021.01); *H01M 50/55* (2021.01); *H01M 50/553* (2021.01); *H01M 50/562* (2021.01); *C09J 2203/33* (2013.01); *C09J 2301/208* (2020.08); *C09J 2423/10* (2013.01); *C09J 2451/00* (2013.01)

(58) Field of Classification Search

CPC .............. C09J 2203/33; C09J 2301/208; C09J 2451/00; C09J 2301/304; C09J 151/06; C09J 7/35

See application file for complete search history.

(56) References Cited

U.S. PATENT DOCUMENTS

| | | | |
|---|---|---|---|
| 2016/0099447 A1 | 4/2016 | Takada | |
| 2016/0177136 A1* | 6/2016 | Park | C09J 7/385 |
| | | | 429/185 |
| 2018/0076421 A1 | 3/2018 | Ogihara et al. | |
| 2019/0061327 A1 | 2/2019 | Mochizuki et al. | |
| 2020/0194737 A1* | 6/2020 | Yasuda | H01M 50/131 |

FOREIGN PATENT DOCUMENTS

| | | | | |
|---|---|---|---|---|
| JP | 2009-259739 A | | 11/2009 | |
| JP | 2010-272348 A | | 12/2010 | |
| JP | 2013-062252 A | | 4/2013 | |
| JP | 2015-079638 A | | 4/2015 | |
| JP | 2015-170428 A | | 9/2015 | |
| JP | 2015-232945 A | | 12/2015 | |
| JP | 2016-91939 A | | 5/2016 | |
| JP | 2016091939 | * | 5/2016 | Y02E 60/10 |
| JP | 2016-207564 A | | 12/2016 | |
| JP | 2017-069151 A | | 4/2017 | |
| JP | 2017103027 A | * | 6/2017 | |
| JP | 2017-120790 A | | 7/2017 | |
| JP | 2017-137063 A | | 8/2017 | |
| JP | 2017-139120 A | | 8/2017 | |
| JP | 6728653 B2 | * | 7/2020 | |
| WO | 2012/077706 A1 | | 6/2012 | |
| WO | 2015/008826 A1 | | 1/2015 | |
| WO | 2018/110702 A1 | | 6/2018 | |

OTHER PUBLICATIONS

Machine Translation of JP 6728653 B2 (Year: 2025).*

Feb. 9, 2022 extended Search Report issued in European Patent Application No. 19822017.0.

Sep. 24, 2019 International Search Report issued in International Patent Application No. PCT/JP2019/024452.

Nov. 30, 2020 Notice of Opposition issued in Japanese Patent No. JP6706014.

Dec. 1, 2020 Notice of Opposition issued in Japanese Patent No. JP6706014.

Dec. 2, 2020 Notice of Opposition issued in Japanese Patent No. JP6706014.

Mar. 18, 2021 Notice of Opposition issued in Japanese Patent No. JP6760533.

Mar. 18, 2021 Notice of Opposition issued in Japanese Patent No. JP6760533B.

Mar. 23, 2021 Notice of Opposition issued in Japanese Patent Application No. JP6760533.

Zhang Cheng-wu et al., "Blends of Polypropylene and Syndiotactic 1,2-Polybutadiene: Morphology, Crystallization Behaviors and Mechanical Properties", Chem. Res. Chinese Universities, 24(5), (2008), pp. 640-643.

Mar. 18, 2021 Notice of Reason for Revocation issued in Japanese Patent Application No. JP2020-700925.

Sep. 7, 2021 Notice of Reason for Revocation issued in Japanese Patent Application No. 2021-700289.

Morio Kojima et al., "Supplementary Edition Visual Introduction to Crystalline Polymers", Agne Technology Center, Chuchi Sanskrit Co., Ltd. Published on (2009) pp. 1, 7, 9.

Edward P. Moore Jr., "The Polypropylene Handbook", Kogyo Choukai Co., Ltd. published on (1998), pp. 1,7, 8.

* cited by examiner

ADHESIVE FILM FOR METAL TERMINAL, METAL TERMINAL WITH ADHESIVE FILM, AND BATTERY

TECHNICAL FIELD

The present invention relates to an adhesive film for a metal terminal, a metal terminal with an adhesive film, and a battery.

BACKGROUND ART

Various types of batteries have been developed heretofore, and in every battery, a packaging material is an essential member for sealing battery elements such as an electrode and an electrolyte. Metallic packaging materials have been often used heretofore as battery packages, but in recent years, batteries have been required to be diversified in shape, and desired to be thinner and lighter as performance of, for example, electric cars, hybrid electric cars, personal computers, cameras and mobile phones has been enhanced. However, metallic packaging materials that have often been heretofore used have the disadvantage that it is difficult to keep up with diversification in shape, and there is a limit on weight reduction.

Thus, in recent years, there has been proposed a laminated sheet with a base material layer, an adhesive layer, a barrier layer and a heat-sealable resin layer laminated in this order has been proposed as a packaging material which is easily processed into diversified shapes and is capable of achieving thickness reduction and weight reduction. When such a film-shaped packaging material is used, a battery element is sealed with the packaging material by heat-welding the peripheral edge portion of the packaging material by heat sealing while the heat-sealable resin layers located at the innermost layer of the packaging material face each other.

A metal terminal protrudes from the heat-sealed portion of the packaging material, and the battery element sealed with the packaging material is electrically connected to the outside by a metal terminal electrically connected to an electrode of the battery element. That is, a portion with the metal terminal, in the portion where the packaging material is heat-sealed, is heat-sealed with the metal terminal sandwiched between heat-sealable resin layers. Since the metal terminal and the heat-sealable resin layer is formed of mutually different materials, adhesion tends to decrease at the interface between the metal terminal and the heat-sealable resin layer.

Thus, an adhesive film may be disposed between the metal terminal and the heat-sealable resin layer for the purpose of, for example, enhancing adhesion between the metal terminal and the heat-sealable resin layer.

PRIOR ART DOCUMENT

Patent Document

Patent Document 1: Japanese Patent Laid-open Publication No. 2015-79638

SUMMARY OF THE INVENTION

Problems to be Solved by the Invention

Such an adhesive film is required to have high adhesion with a packaging material and a metal terminal.

Under the above-mentioned circumstances, a main object of the present invention is to provide an adhesive film for a metal terminal, which is excellent in adhesion with a metal terminal when coming into contact with an electrolytic solution. Another object of the present invention is to provide a metal terminal with an adhesive film and a battery in which the adhesive film for a metal terminal is used.

Means for Solving the Problem

The present inventors have extensively conducted studies for achieving the above-described object. As a result, the present inventors have found that an adhesive film for a metal terminal exhibits high adhesion after being laminated with a metal terminal and then immersed in an electrolytic solution, where the adhesive film for a metal terminal is interposed between the metal terminal electrically connected to an electrode of a battery element and a packaging material sealing the battery element, includes at least one resin layer having a polyolefin backbone, and has a melting peak within the range of 120° C. or higher and 156° C. or lower when measured with a differential scanning calorimeter. The present invention is an invention that has been completed by further conducting studies based on the above-mentioned findings.

That is, the present invention provides an invention of the aspects described below.

Item 1

An adhesive film for a metal terminal which is interposed between the metal terminal electrically connected to an electrode of a battery element and a packaging material sealing the battery element, the adhesive film for a metal terminal including at least one resin layer having a polyolefin backbone, the adhesive film for a metal terminal having a melting peak within the range of 120° C. or higher and 156° C. or lower when measured with a differential scanning calorimeter.

Item 2

The adhesive film for a metal terminal according to item 1, wherein the resin layer having a polyolefin backbone includes a layer in which a sea-island structure is observed when a cross-section is observed with an electron microscope.

Item 3

The adhesive film for a metal terminal according to item 1 or 2, wherein the adhesive film for a metal terminal has a thickness residual ratio of 40% or more, the thickness residual ratio being measured by a measurement method including:

preparing an aluminum plate having a thickness of 100 μm and the adhesive film for a metal terminal;

measuring a thickness A (μm) of the adhesive film for a metal terminal;

stacking the adhesive film for a metal terminal on a central portion of the aluminum plate in such a manner that a length direction and a width direction of the aluminum plate are coincident, respectively, with a length direction and a width direction of the adhesive film for a metal terminal; disposing a polyethylene terephthalate film having a thickness of 12 μm on the adhesive film for a metal terminal;

preparing two 7 mm-wide metal plates larger in length than the aluminum plate, performing heating and pressurizing with the metal plates from above and below the aluminum plate and the adhesive film for a metal terminal in such a manner as to cover an entire surface of the adhesive film for a metal terminal under the conditions of 190° C., a surface pressure of 1.27 MPa and a time of 3 seconds, and peeling the polyethylene terephthalate film from a metal adhesive film to obtain a laminate of the aluminum plate and the adhesive film for a metal terminal;

measuring a thickness B (μm) of a portion heated and pressurized of the laminate; and calculating a thickness residual ratio of the adhesive film for a metal terminal from the following equation:

thickness residual ratio of adhesive film for a metal terminal (%)=(thickness B−100)/thickness A×100.

Item 4

The adhesive film for a metal terminal according to any one of items 1 to 3, wherein a heat shrinkage ratio of the adhesive film for a metal terminal in a flow direction is 40% or more and 95% or less.

Item 5

The adhesive film for a metal terminal according to any one of items 1 to 4, wherein a peak derived from maleic anhydride is detected when the adhesive film for a metal terminal is analyzed by infrared spectroscopy.

Item 6

The adhesive film for a metal terminal according to any one of items 1 to 5, wherein the resin layer having a polyolefin backbone includes a polypropylene layer.

Item 7

The adhesive film for a metal terminal according to item 6, wherein the polypropylene layer contains block polypropylene.

Item 8

The adhesive film for a metal terminal according to item 6 or 7, wherein the polypropylene layer contains random polypropylene.

Item 9

The adhesive film for a metal terminal according to any one of items 6 to 8, wherein the polypropylene layer is formed of unstretched polypropylene.

Item 10

The adhesive film for a metal terminal according to any one of items 6 to 9, wherein the polypropylene layer has a laminated configuration in which a layer formed of random polypropylene, a layer formed of block polypropylene, and a layer formed of random polypropylene are laminated in this order.

Item 11

The adhesive film for a metal terminal according to any one of items 6 to 10, wherein the polypropylene layer has a sea-island structure when a cross-section is observed with an electron microscope, and a ratio of an area of island portions is 5% or more in the sea-island structure.

Item 12

The adhesive film for a metal terminal according to any one of items 1 to 11, wherein the resin layer having a polyolefin backbone includes an acid-modified polypropylene layer.

Item 13

The adhesive film for a metal terminal according to item 12, wherein the acid-modified polypropylene layer includes random-based acid-modified polypropylene.

Item 14

The adhesive film for a metal terminal according to any one of items 1 to 13, wherein a surface roughness of the adhesive film for a metal terminal on one side is 0.5 μm or more.

Item 15

The adhesive film for a metal terminal according to any one of items 1 to 13, wherein the packaging material includes a laminated sheet including at least a base material layer, a barrier layer and a heat-sealable resin layer in this order, and the adhesive film for a metal terminal is interposed between the heat-sealable resin layer and the metal terminal.

Item 16

A battery including at least a battery element including a positive electrode, a negative electrode and an electrolyte, a packaging material sealing the battery element, and a metal terminal which is electrically connected to each of the positive electrode and the negative electrode, and protrudes outside the packaging material, wherein the adhesive film for a metal terminal according to any one of items 1 to 15 is interposed between the metal terminal and the packaging material.

Item 17

A metal terminal with an adhesive film, including a metal terminal, and the adhesive film for a metal terminal according to any one of items 1 to 15, which covers a part of the metal terminal.

Advantages of the Invention

According to the present invention, it is possible to provide an adhesive film for a metal terminal, which is excellent in adhesion with a metal terminal when coming into contact with an electrolytic solution. According to the present invention, it is also possible to provide a metal terminal with an adhesive film and a battery in which the adhesive film for a metal terminal is used.

EMBODIMENTS OF THE INVENTION

The adhesive film for a metal terminal according to the present invention is an adhesive film for a metal terminal which is interposed between the metal terminal electrically connected to an electrode of a battery element and a packaging material sealing the battery element, and the adhesive film for a metal terminal includes at least one resin layer having a polyolefin backbone, and has a melting peak within the range of 120° C. or higher and 156° C. or lower when measured with a differential scanning calorimeter. The adhesive film for a metal terminal according to the present invention and a battery in which the adhesive film is used will be described in detail below.

In this specification, a numerical range indicated by the term "A to B" means "A or more" and "B or less". For example, the expression of "2 to 15 mm" means 2 mm or more and 15 mm or less.

1. Adhesive Film for Metal Terminal

Figure 1:
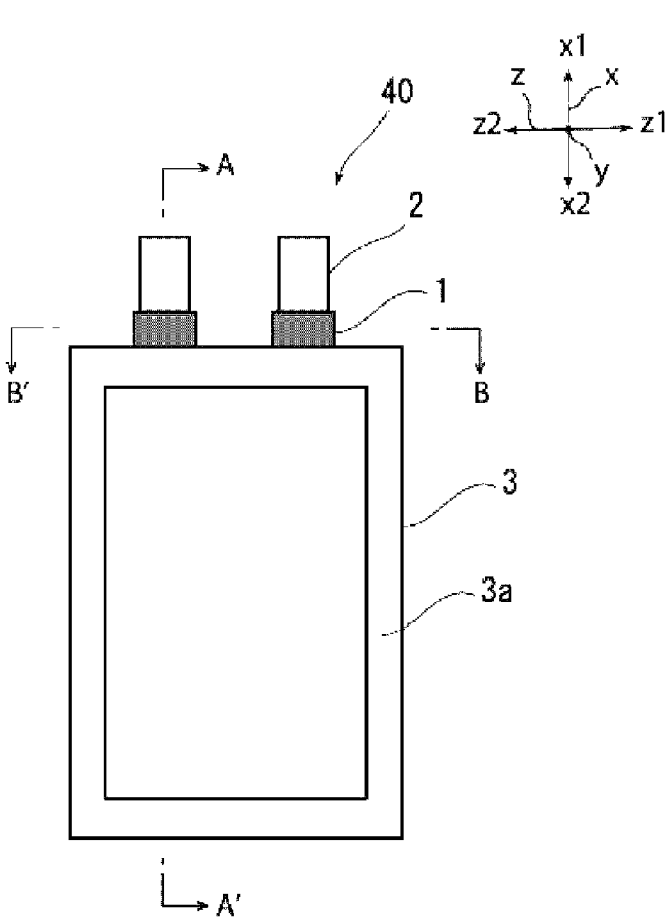
FIG. 1 is a schematic plan view of a battery of the present invention.
Figure 2:
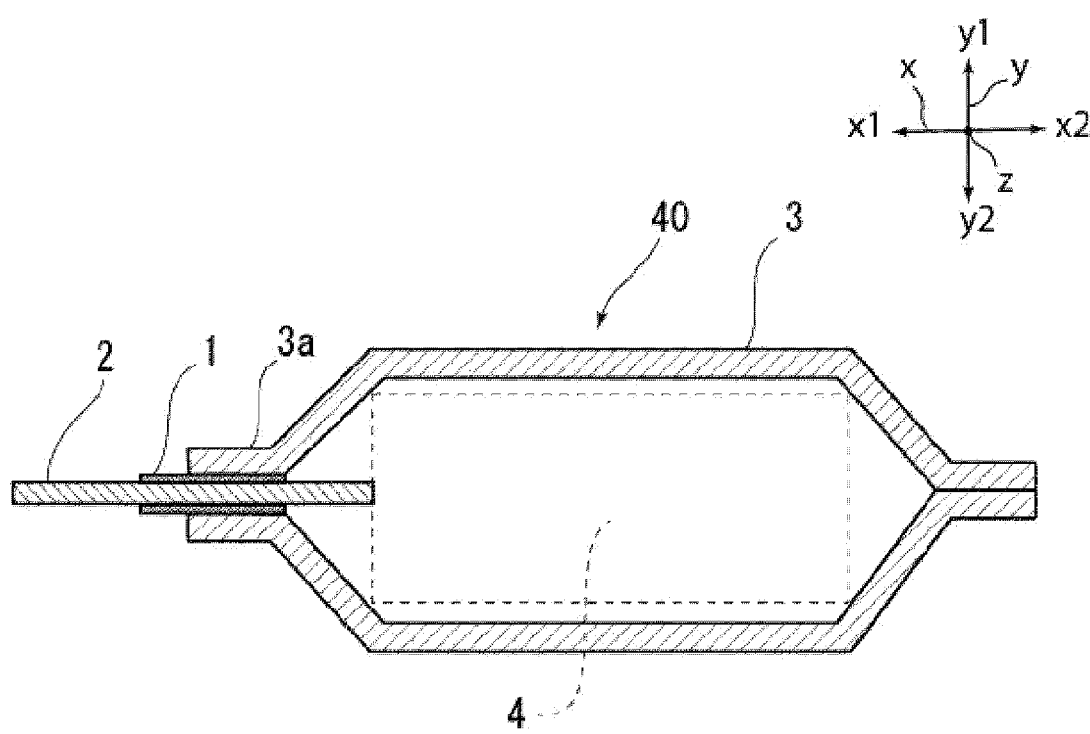
FIG. 2 is a schematic sectional view taken along line A-A' in FIG. 1.
Figure 3:
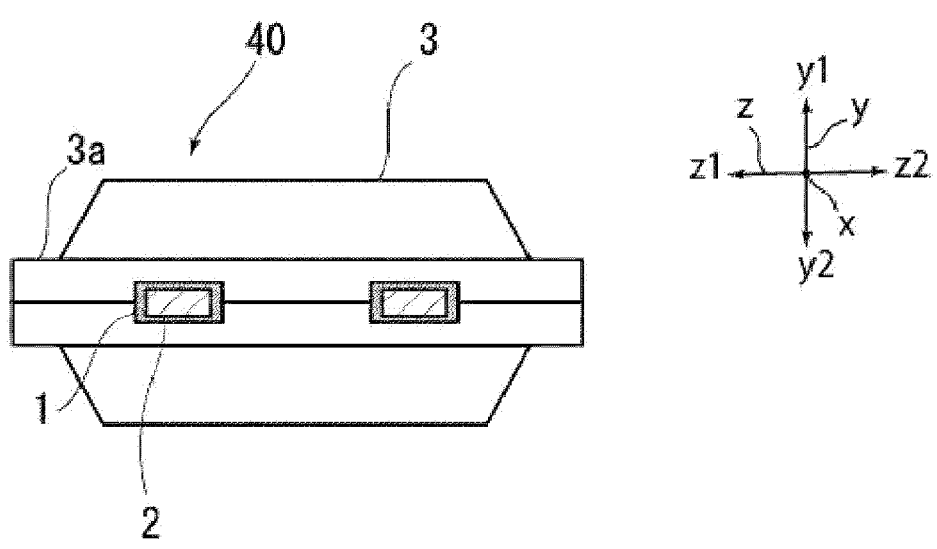
FIG. 3 is a schematic sectional view taken along line B-B' in FIG. 1.

The adhesive film for a metal terminal according to the present invention is interposed between a metal terminal electrically connected to an electrode of a battery element and a packaging material for sealing the battery element. Specifically, for example, as shown in FIGS. 1 to 3, an adhesive film 1 for a metal terminal according to the present invention is interposed between a metal terminal 2 electrically connected to an electrode of a battery element 4 and a packaging material 3 for sealing the battery element 4. In addition, the metal terminal 2 protrudes outside the packaging material 3, and is sandwiched by the packaging material 3 at a peripheral edge portion 3a of the heat-sealed packaging material 3 with interposition of the adhesive film 1 for a metal terminal. In the present invention, the packaging material is heat-sealed at a temperature of normally about 160 to 220° C. and a pressure of normally about 0.5 to 2.0 MPa.

The adhesive film 1 for a metal terminal according to the present invention is provided for improving adhesion between the metal terminal 2 and the packaging material 3. By improving adhesion between the metal terminal 2 and the packaging material 3, the sealing property of the battery element 4 is improved. As described above, when the battery element 4 is hermetically sealed, the battery element is sealed by heat sealing in a state in which the metal terminal 2 electrically connected to the electrode of the battery element 4 protrudes outside the packaging material 3. Here, the metal terminal 2 formed of metal and a heat-sealable resin layer 34 (layer formed of heat-sealable resin such as polyolefin) located at the innermost layer of the packaging material 3 are formed of different materials, and therefore when the adhesive film is not used, the sealing property of the battery element is apt to be low at an interface between the metal terminal 2 and the heat-sealable resin layer 34. In addition, even when an adhesive film is used, the sealing property of the battery element is apt to be low if the resistance of the adhesive film to an electrolytic solution is low.

The adhesive film 1 for a metal terminal according to the present invention includes a resin layer 10 having at least one polyolefin backbone. The resin layer 10 having a polyolefin backbone may be a single layer, or may have a plurality of layers. In addition, as described later, the adhesive film 1 for a metal terminal according to the present invention may include a support member such as a nonwoven fabric in addition to the resin layer 10 having a polyolefin backbone (not shown). The support member is a layer that functions as a support for the adhesive film 1 for a metal terminal.

Figure 4:
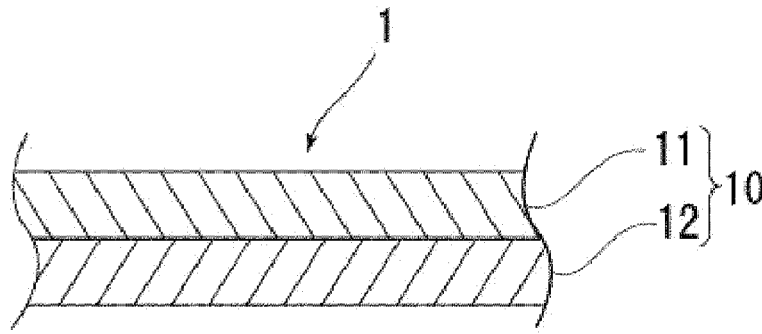
FIG. 4 is a schematic sectional view of an adhesive film for a metal terminal according to the present invention.
Figure 5:
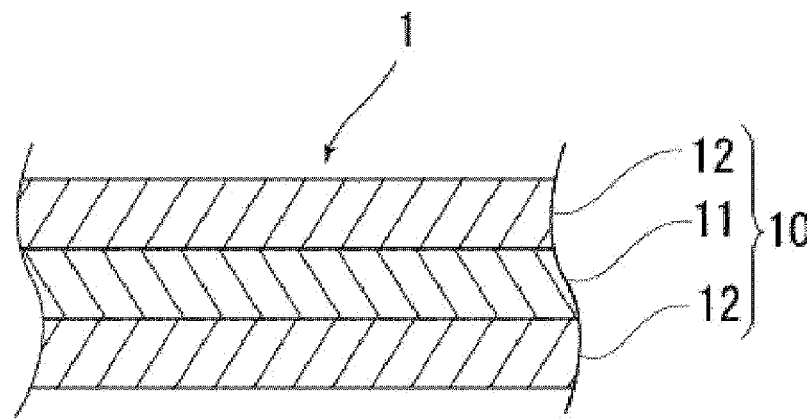
FIG. 5 is a schematic sectional view of an adhesive film for a metal terminal according to the present invention.

From the viewpoint of improving adhesion with the metal terminal in the case of coming into contact with an electrolytic solution, it is preferable that as shown in FIGS. 4 and 5, the resin layer 10 having a polyolefin backbone includes at least one of a polypropylene layer 11 and an acid-modified polypropylene layer 12, more preferably both the polypropylene layer 11 and the acid-modified polypropylene layer 12. FIG. 4 is a schematic view where the adhesive film 1 for a metal terminal according to the present invention is formed of a resin layer 10 having a polyolefin backbone, and the resin layer 10 having a polyolefin backbone is a laminate of the polypropylene layer 11 and the acid-modified polypropylene layer 12. FIG. 5 is a schematic view where the adhesive film 1 for a metal terminal according to the present invention is formed of the resin layer 10 having a polyolefin backbone, and the resin layer 10 having a polyolefin backbone is a laminate in which the acid-modified polypropylene layer 12, the polypropylene layer 11 and the acid-modified polypropylene layer 12.

As will be described later, a plurality of layers formed of the same polypropylene or different polypropylenes may be continuously laminated on the polypropylene layer 11, with the plurality of layers forming the polypropylene layer 11. Similarly, a plurality of layers formed of the same acid-modified polypropylene or different acid-modified polypropylenes may be continuously laminated on the acid-modified polypropylene layer 12, with the plurality of layers forming the acid-modified polypropylene layer 12.

The acid-modified polypropylene layer 12 formed of acid-modified polypropylene is superior in adhesion with a metal material over the polypropylene layer 11 formed of polypropylene. Thus, by disposing the adhesive film 1 for a metal terminal according to the present invention between the metal terminal 2 and the packaging material 3 in such a manner that the acid-modified polypropylene layer 12 is located on the metal terminal 2 side, the sealing property of the battery element can be effectively improved. Therefore, in the adhesive film 1 for a metal terminal according to the present invention, it is preferable that the acid-modified polypropylene layer 12 forms a surface layer on at least one side, more preferably on each of both sides, of the adhesive film for a metal terminal.

When the resin layer 10 having a polyolefin backbone includes the polypropylene layer 11 and the acid-modified polypropylene layer 12, the total thickness of the polypropylene layer 11 is preferably in the range of about 0.75 to 3.2, more preferably in the range of about 0.8 to 2.0, in terms of a relative value against the total thickness of the acid-modified polypropylene layer 12, which is defined as 1, from the viewpoint of improving adhesion with the metal terminal in the case of coming into contact with an electrolytic solution.

Specific examples of the preferred laminated configuration of the adhesive film 1 for a metal terminal according to the present invention include a two-layer configuration of the acid-modified polypropylene layer 12 and the polypropylene layer 11; a three-layer structure in which the acid-modified polypropylene layer 12, the polypropylene layer 11 and the acid-modified polypropylene layer 12 are laminated in this order; a five-layer structure in which the acid-modified polypropylene layer 12, the polypropylene layer 11, the acid-modified polypropylene layer 12, the polypropylene layer 11 and the acid-modified polypropylene layer 12 are laminated in this order; and a three-layer structure in which the acid-modified polypropylene layer 12, a support member (nonwoven fabric) and the acid-modified polypropylene layer 12 are laminated in this order. Of these, a two-layer configuration of the acid-modified polypropylene layer 12 and the polypropylene layer 11; and a three-layer structure in which the acid-modified polypropylene layer 12, the polypropylene layer 11 and the acid-modified polypropylene layer 12 are laminated in this order are more preferable.

In the adhesive film 1 for a metal terminal according to the present invention, it is preferable that all the layers are formed of polyolefin (i.e. all the layers are each formed of the resin layer 10 having a polyolefin backbone). It is preferable that the adhesive film 1 for a metal terminal according to the present invention is formed of at least one of the acid-modified polypropylene layer 12 and the polypropylene layer 11, and it is also preferable that the adhesive film for a metal terminal further includes another polyolefin layer formed of polyolefin. Specific examples of the polyolefin forming the polyolefin layer include polyethylene and acid-modified polyethylene. The component which acid-modifies ethylene in the acid-modified polyethylene is not particularly limited, and examples thereof include unsaturated carboxylic acids and anhydrides thereof which are used for acid modification and exemplified for the acid-modified polypropylene layer 12 described later.

The thickness of the adhesive film 1 for a metal terminal according to the present invention is not particularly limited, and is preferably about 40 to 200 μm, more preferably about 55 to 180 μm, still more preferably about 60 to 150 μm, from the viewpoint of improving adhesion with the metal terminals in the case of coming into contact with an electrolytic solution.

When the adhesive film 1 for a metal terminal according to the present invention is measured with a differential scanning calorimeter, a melting peak is observed at a temperature in the range of 120 to 156° C. From the viewpoint of improving the adhesion with the metal terminal in the case of coming into contact with an electrolytic solution, the lower limit of the melting peak temperature is preferably about 130° C. or higher, more preferably about 135° C. or higher, the upper limit of the melting peak temperature is preferably about 150° C. or lower, more preferably about 148° C. or lower, and the melting peak temperature is preferably in the range of about 120 to 150° C., about 120 to 148° C., about 130 to 156° C., about 130 to 150° C., about 130 to 148° C., about 135 to 156° C., about 135 to 150° C., or about 135 to 148° C. In the adhesive film 1 for a metal terminal according to the present invention, a melting peak may be observed at a temperature in the range of 120 to 156° C., and a melting peak may be further present at a temperature within or outside the above-mentioned range. The method for measuring the melting peak is the same way as a method for measuring the melting peak temperature of the polypropylene layer 11 as described later except that the object to be measured is the adhesive film 1 for a metal terminal according to the present invention. In the adhesive film 1 for a metal terminal according to the present invention, the layer having a melting peak at a temperature in the range of 120 to 156° C. is not limited, and is preferably the resin layer 10 having a polyolefin backbone, more preferably at least of the polypropylene layer 11 and the acid-modified polypropylene layers 12 described later. In the adhesive film 1 for a metal terminal according to the present invention, the melting peak temperature can be adjusted according to preferably the laminated configuration and the composition of the resin layer 10 having a polyolefin backbone, the heating temperature, heating rate, the cooling temperature, the cooling rate and the processing rate in formation of the resin layer 10, and the like.

For the adhesive film 1 for a metal terminal according to the present invention, from the same viewpoint, the thickness residual ratio of the adhesive film for a metal terminal, which is measured by a measurement method as described below is preferably about 40.0% or more, about 42.0% or more, or about 45.0% or more. The upper limit of the thickness residual ratio is preferably about 85.0% or less, about 80.0% or less, about 62.0% or less, about 60.0% or less, or about 58.0% or less. The thickness residual ratio is in the range of preferably about 40.0 to 85.0%, about 40.0 to 80.0%, about 40.0 to 62.0%, about 40.0 to 60.0%, about 40.0 to 58.0%, about 42.0 to 85.0%, about 42.0 to 80.0%, about 42.0 to 62.0%, about 42.0 to 60.0%, about 42.0 to 58.0%, about 45.0 to 85.0%, about 45.0 to 80.0%, about 45.0 to 62.0%, about 45.0 to 60.0%, or about 45.0 to 58.0%. By using the adhesive film 1 for a metal terminal in which the residual ratio of 40.0% or more, a short-circuit between the metal terminal and a barrier layer present in a packaging material can be effectively suppressed, and adhesion between the packaging material and the adhesive film for a metal terminal can be further improved. By using the adhesive film 1 for a metal terminal in which the residual ratio of 85% or less, the shape of a level difference of the metal terminal can be suitably followed, and the end part of the metal terminal can be suitably covered.

(Measurement of Thickness Residual Ratio of Adhesive Film for Metal Terminal)

An aluminum plate (pure aluminum-based plate, JIS H4160-1994 AlN30H-O) having a thickness of 100 μm and an adhesive film for a metal terminal are prepared. The thickness A (μm) of the adhesive film for a metal terminal is measured with a micro-gauge. The adhesive film for a metal terminal is stacked on a central portion of the aluminum plate in such a manner that the length direction and the width direction of the aluminum plate are coincident, respectively, with the length direction and the width direction of the adhesive film for a metal terminal. At this time, the adhesive film for a metal terminal is disposed in such a manner that a surface of the adhesive film for a metal terminal contacts the aluminum plate. A polyethylene terephthalate film having a thickness of 12 μm is disposed on the adhesive film for a metal terminal. Two 7 mm-wide metal plates larger in length than the aluminum plate are prepared, heating and pressurization are performed from above and below the aluminum plate and the adhesive film for a metal terminal in such a manner as to cover the entire surface of the adhesive film for a metal terminal under the conditions of 190° C., a surface pressure of 1.27 MPa and a time of 3 seconds, and the polyethylene terephthalate film is peeled from the metal adhesive film to obtain a laminate of the aluminum plate and the adhesive film for a metal terminal. A thickness B (μm) of a portion heated and pressurized of the laminate is measured with a micro-gauge. A thickness residual ratio of the adhesive film for a metal terminal is calculated from the following equation: thickness residual ratio of adhesive film for a metal terminal (%)=(thickness B−100)/thickness A×100.

In the measurement of the thickness residual ratio, the length direction is a longitudinal direction corresponding to the long side of an object in plan view, and the width direction is a short direction corresponding to the short side of the object in plan view. When the sizes in the length direction and the width direction are equal to each other (square), the length direction and the width direction may be arbitrarily determined.

Depending on the area of the adhesive film for a metal terminal, the residual ratio can be measured with a pressurization load applied to a surface pressure of 1.27 MPa. Specifically, conversion can be performed from the equation: [pressurization load with metal plate (N)]/[area of pressurized adhesive film for metal terminal (mm²)]=surface pressure (MPa). The pressurization load (N) with the metal plate can be adjusted by the air pressure and the diameter of a cylinder adjusting the pressure of the metal plate.

In the measurement of the thickness residual ratio of the adhesive film for a metal terminal, the lengths and the widths of the adhesive film for a metal terminal and the aluminum plate are not limited as long as the residual ratio is measured under the conditions of a temperature of 190° C., a surface pressure of 1.27 MPa and a time of 3 seconds, and for example, when the residual ratio can be measured with a 70 mm-long and 5 mm-wide adhesive film for a metal terminal (a method such as cutting may be employed), the thickness residual ratio of the adhesive film for a metal terminal can be suitably measured using an adhesive film for a metal terminal which has this size, and a 60 mm-long and 25 mm-wide aluminum plate. The [area of the pressurized adhesive film for a metal terminal (mm²)] is an area of a portion where the aluminum plate and the adhesive film for a metal terminal overlap each other, and for example, when an adhesive film for a metal terminal and an aluminum plate, which have the above-mentioned sizes, are used, the area is 60 mm×5 mm. Heating and pressurization for obtaining a laminate of the aluminum plate and the adhesive film for a metal terminal does not substantially change the thickness of the aluminum plate. Even when the size of the adhesive film for a metal terminal to be measured is changed, it is not necessary to change the size of the aluminum plate as long as the above-described measurement can be performed.

The thickness residual ratio of the adhesive film for a metal terminal according to the present invention can be adjusted according to preferably the laminated configuration, the composition, the melting point, the melt mass flow rate (MFR), the thickness and the softening point of the resin layer 10 having a polyolefin backbone, the heating temperature, heating rate, the cooling temperature, the cooling rate and the processing rate in formation of the resin layer 10, and the like.

The melt mass flow rate (MFR) of the entire adhesive film 1 for a metal terminal according to the present invention is not particularly limited, and is preferably about 1 to 15, more preferably about 2 to 12, still more preferably about 2 to 10, from the viewpoint of improving adhesion with the metal terminals in the case of coming into contact with an electrolytic solution. The melt mass flow rate (MFR) of the entire adhesive film 1 for a metal terminal is value measured with a melt indexer under a weight of 2.16 kg at a measurement temperature of 230° C. in accordance with a method conforming to JIS K7210-1 (A method: mass measurement method).

The lower limit of the heat shrinkage ratio (%) of the adhesive film 1 for a metal terminal according to the present invention in a flow direction (MD) is preferably about 40% or more, more preferably about 50% or more, still more preferably about 75% or more, and the upper limit of the heat shrinkage ratio (%) is preferably about 95% or less, more preferably about 90% or less, still more preferably about 85% or less. The heat shrinkage ratio (%) is preferably in the range of about 40 to 95%, about 40 to 90%, about 40 to 85%, about 50 to 95%, about 50 to 90%, and about 50 to 85%, about 75 to 95%, about 75 to 90% or about 75 to 85%. However, when the adhesive film 1 for a metal terminal according to the present invention includes a fibrous sheet or the like as a support member as described later, the heat shrinkage rate is normally below the above-mentioned values. The method for measuring the heat shrinkage ratio (%) is as follows.

(Method for Measuring Heat Shrinkage Ratio (%))

The adhesive film for a metal terminal is cut to a size of 50 mm (MD)×4 mm (TD) in length to obtain a test piece. Next, a length M (mm) of the test piece is measured with a metal scale. Next, the end part (about 1 mm) of the test piece in a length direction is fixed to a wire mesh with a tape, so that the test piece is hung from the wire mesh. In this state, the test piece is placed in an oven heated to 190° C. for 120 seconds, and the test piece is then taken out together with the wire mesh, and naturally cooled in an environment of room temperature (25° C.). Next, a length N (mm) of the test piece naturally cooled to room temperature is measured with a metal scale. The heat shrinkage ratio of the adhesive film for a metal terminal is calculated from the following equation.

$$\text{Heat shrinkage ratio (\%)} = (1-(\text{length } N/\text{length } M)) \times 100$$

When the adhesive film for a metal terminal is heat-sealed in a state of being sandwiched between the metal terminal and the packaging material during sealing of the battery element, the adhesive film for a metal terminal has a portion which is prevented from undergoing a dimensional change by pressure from a metal plate used for heat-sealing, and a portion which is not subject to pressure because of a large distance from the metal plate, and thus shrinks. Here, even the portion which is not subject to pressure moderately heat-shrinks toward the portion subject to pressure, so that the portion subject to pressure can be effectively inhibited from having an excessively small thickness. On the other hand, when the heat shrinkage of the adhesive film for a metal terminal is excessively large, there is the possibility that the adhesive film 1 for a metal terminal is placed on the metal terminal, and the adhesive film for a metal terminal is caused to move by heat shrinkage in a preheating stage before the adhesive film is subjected to heat sealing, so that misalignment occurs in the positional relationship between the metal terminal and the adhesive film for a metal terminal. Thus, it is desirable that the adhesive film 1 for a metal terminal according to the present invention have a moderate heat shrinkage ratio as described above.

The heat shrinkage ratio of the adhesive film for a metal terminal according to the present invention can be adjusted according to preferably the laminated configuration, the composition, the melting point, the melt mass flow rate (MFR) and the thickness of the resin layer 10 having a polyolefin backbone, the heating temperature, heating rate, the cooling temperature, the cooling rate and the processing rate in formation of the resin layer 10, and the like.

The lower limit of the surface roughness (arithmetic mean roughness Ra) of one surface of the adhesive film 1 for a metal terminal according to the present invention is prefer-ably about 0.5 μm or more, more preferably about 1 μm or more, still more preferably about 5 μm or more, even more preferably about 10 μm or more, the upper limit of the surface roughness is preferably about 50 μm or less, more preferably about 30 μm or less, still more preferably about 20 μm or less, even more preferably about 18 μm or less, and the surface roughness is preferably in the range of about 0.5 to 50 μm, about 0.5 to 30 μm, about 0.5 to 20 μm, about 0.5 to 18 μm, about 1 to 50 μm, about 1 to 30 μm, about 1 to 20 μm, about 1 to 18 μm, about 5 to 50 μm, about 5 to 30 μm, about 5 to 20 μm, about 5 to 18 μm, about 10 to 50 μm, about 10 to 30 μm, about 10 to 20 μm or about 10 to 18 μm. Specifically, it is preferable that the surface exposed to the outside in the layer forming the surface layer of the adhesive film 1 for a metal terminal has a surface roughness as mentioned above. Each of both surfaces may be have a surface roughness as mentioned above. For example, when the acid-modified polypropylene layer 12 forms a surface layer on at least one side of the adhesive film 1 for a metal terminal, the surface roughness of the acid-modified poly-propylene layer 12 is preferably in the above-mentioned range. The surface roughness (arithmetic mean roughness Ra) of the adhesive film 1 for a metal terminal is a value obtained by measuring the surface of the adhesive film for a metal terminal in accordance with the method specified in JIS B 0601:2013.

(Polypropylene Layer 11)

In the present invention, it is preferable that the resin layer having a polyolefin backbone includes the polypropylene layer 11. The polypropylene layer 11 is a layer formed of polypropylene.

Figure 9:
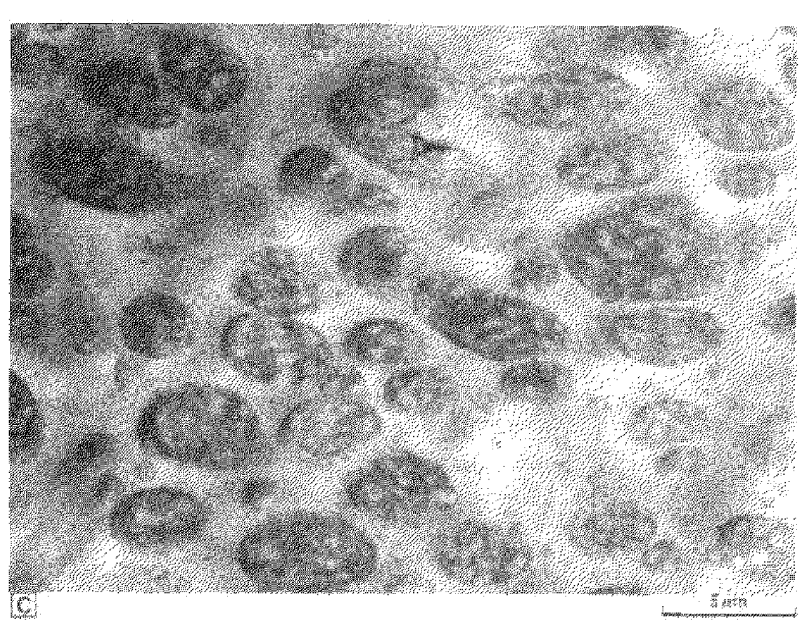
FIG. 9 shows a transmission electron microscope photograph indicated with "C" in "Polymer Microphotographs, Visualized Polymers 1. Patterns and Functions of Molecular Associations" (editor: The Society of Polymer Science, Japan; publisher: Itaru Yamamoto; publishing office: BAIFUKAN CO., LTD; publication of first edition: May 30, 1986), page 29 (a scale bar represents a length of 5 μm).

In the present invention, it is preferable that in the polypropylene layer 11, a sea-island structure is observed when a cross-section is observed with an electron micro-scope. The sea-island structure being observed on a cross-section (cross-section along TD) of the polypropylene layer 11 means that sea portions and island portions are observed as in, for example, the electron microscope photograph shown in FIG. 9. FIG. 9 shows a transmission electron microscope photograph indicated with "C" in "Polymer Microphotographs, Visualized Polymers 1. Patterns and Functions of Molecular Associations" (editor: The Society of Polymer Science, Japan; publisher: Itaru Yamamoto; publishing office: BAIFUKAN CO., LTD; publication of first edition: May 30, 1986), page 29 (a scale bar represents a length of 5 μm). The sea-island structure on a cross-section of the polypropylene layer 11 can be identified by staining the cross-section of the polypropylene layer with osmium tetroxide (OsO₄) and observing the cross-section with an electron microscope photograph as shown in FIG. 9. In FIG.

9, the sea portions are brighter than the island portions, but the sea portions look darker than the island portions in some measurement methods or under some conditions. In any case, it is possible to measure the ratio of the area of island portions in the sea-island structure as long as sea portions can be discriminated from island portions.

In the sea-island structure of the polypropylene layer 11, the ratio of the area of island portions is not particularly limited, and from the viewpoint of improving adhesion with the metal terminal in the case of coming into contact with an electrolytic solution, the lower limit of the ratio of the area of island portions is preferably about 5% or more, more preferably about 10% or more, still more preferably about 20% or more, even more preferably about 25% or more, the upper limit of the ratio of the area of island portions is preferably about 50% or less, more preferably about 40% or less, still more preferably about 35% or less, and the ratio of the area of island portions is in the range of about 5 to 50%, about 5 to 40%, about 5 to 35%, about 10 to 50%, about 10 to 40%, about 10 to 35%, about 20 to 50%, about 20 to 40%, about 20 to 35%, about 25 to 50%, about 25 to 40% or about 25 to 35%. The method for measuring the ratio of the area of island portions in the sea-island structure of the polypro-pylene layer 11 is as follows. When the ratio of the area of island portions is 2% or less, it is determined that there is substantially no sea-island structure.

(Method for Measuring Ratio of Area of Island Portions in Sea-Island Structure)

The adhesive film for a metal terminal is embedded in a thermosetting epoxy resin, and cured. A cross-section extending in an intended direction (cross-section along TD) is prepared using a commercially available rotary microtome (for example, EM UC6 manufactured by Leica) and a glass knife. The film as well as the embedding resin is stained with ruthenium tetroxide overnight. Since after the staining, the resin expands, so that a sea-island structure cannot be identified near the cross-section, the expanded portion is trimmed with a microtome. Subsequently, a cut is made to about 1 μm to 2 μm with a diamond knife, followed by observing the cross-section. The stained cross-section is observed with a field emission scanning electron microscope (e.g. S-4800 TYPE1 manufactured by Hitachi High-Tech Corporation, measurement conditions: 3 kV 20 mA High WD6 mm detector (Upper)), and an image (magnification is 10,000 times) is acquired. Next, using image processing software capable of binarizing an image (e.g. image analysis software WinROOF (Ver 7.4) from MITANI CORPORA-TION), island portions and sea portions of the sea-island structure in the image are binarized to determine the ratio of the area of island portions (total area of island portions/area of image measured). As specific image processing condi-tions, for example, the conditions described in examples are employed.

Since a sea-island structure is observed when the cross-section of the polypropylene layer 11 is observed with an electron microscope, the cold resistance strength is enhanced while excellent heat resistance of the adhesive film for a metal terminal is maintained In addition, adhesion with the metal terminal in the case of coming into contact with an electrolytic solution is improved.

In the present invention, it is preferable that the polypro-pylene layer 11 is formed of polypropylene in which in measurement of the wide-angle X-ray diffraction, the ratio of the intensity of a peak corresponding to the 110 plane of a polypropylene crystal to the intensity of a peak corre-sponding to the 040 plane (peak intensity on 040 plane/peak intensity of 110 plane) is within the range of 0.5 to 1.5 when calculated from a diffraction pattern of the polypropylene crystal. Preferably, such a polypropylene layer 11 is formed of, for example, unstretched polypropylene. By analyzing the polypropylene layer 11 using the X-ray diffraction method, It can be confirmed that the polypropylene layer 11 is formed of unstretched polypropylene, and is not formed of stretched polypropylene. Specifically, it is preferable that in measurement of the wide angle X-ray diffraction of the polypropylene layer 11 formed of unstretched polypropylene, the ratio of the intensity of a peak corresponding to the 110 plane of a polypropylene crystal to the intensity of a peak corresponding to the 040 plane (peak intensity on 040 plane/peak intensity of 110 plane) is within the range of 0.5 to 1.5 when calculated from a diffraction pattern of the polypropylene crystal, and a polypropylene layer formed of stretched polypropylene is outside this range.

The peak corresponding to the 110 plane appears near $2\theta=14°$, and the peak corresponding to the 040 plane appears near $2\theta=17°$. The conditions for measurement by wide angle X-ray diffraction are set to Soller/PCS (angular aperture of incident parallel slit): 5.0 deg, IS length (length of length-limiting slit): 10.0 mm, PSA: open (angular aperture of light-receiving PSA is open), Soller (angular aperture of light-receiving parallel slit): 5.0 deg, $2\theta/\theta$: 2 to 40 deg, and step: 0.04 deg.

In the present invention, it is preferable that in the polypropylene layer 11, the ratio of the height "A" of the intensity of a crystalline peak appearing at about 809 $cm^{-1}$ to the height "B" of the intensity of a noncrystalline peak appearing at about 842 $cm^{-1}$ (A/B) is 1.6 or less in analysis of the polypropylene layer by a Raman spectroscopic method. The measurement conditions are set to a laser wavelength of 633 nm, a grating of 600 gr/mm, a confocal hole size of 100 μm, a microscope lens magnification of 10 times, an exposure time of 15 sec and an integration count of 1 time, and the Raman spectrum is measured on a cross-section parallel to machine direction (MD) of the polypropylene layer 11 in such a manner that MD and an incident laser polarization plane are parallel to each other. In addition, a straight line connecting 710 $cm^{-1}$ and 925 $cm^{-1}$ is used as a baseline. For the analysis condition, peak heights at 809 $cm^{-1}$ and 842 $cm^{-1}$ in baseline correction are calculated as peak intensities. The height "A" of the intensity of a crystalline peak appearing at about 809 $cm^{-1}$ refers to a peak which is attributed to a combination mode of main chain CC stretching and CH3 deformation vibration. The height "B" of the intensity of a noncrystalline peak appearing at about 842 $cm^{-1}$ refers to a peak which is attributed to a CH3 deformation vibration mode. Preferably, such a polypropylene layer 11 is formed of, for example, unstretched polypropylene. By analyzing the polypropylene layer 11 using the Raman spectroscopic method, It can be confirmed that the polypropylene layer 11 is formed of unstretched polypropylene, and is not formed of stretched polypropylene. Specifically, when the ratio of the height "A" of the intensity of a crystalline peak appearing at about 809 $cm^{-1}$ to the height "B" of the intensity of a noncrystalline peak appearing at about 842 $cm^{-1}$ (A/B) is 1.6 or less in analysis of the polypropylene layer by the Raman spectroscopic method, it can be confirmed that the polypropylene layer 11 is formed of unstretched polypropylene.

In the present invention, the method for determining the MD of the polypropylene layer 11 is as follows. A cross-section of the polypropylene layer 11 in a length direction and cross-sections (a total of 10 cross-sections) of the polypropylene layer 11 shifted in direction by 10 degrees from a direction parallel to the cross-section in the length direction to a direction perpendicular to the cross-section in the length direction are each observed with an electron microscope to identify a sea-island structure. Next, the shape of each island is observed on each of the cross-sections. For the shape of each island, the linear distance between the leftmost end in a direction perpendicular to a thickness direction of the polypropylene layer 11 and the rightmost end in this perpendicular direction is set to a diameter y. For each cross-section, an average of the diameters y of 20 island shapes largest in the diameter y is calculated. The direction parallel to a cross-section which is the largest in terms of the average of the diameters y of island shapes is determined as MD.

The polypropylene contained in the polypropylene layer 11 is preferably crystalline or noncrystalline polypropylene such as homopolypropylene, a block copolymer of polypropylene (i.e. block polypropylene, e.g. a block copolymer of propylene and ethylene), or a random copolymer of polypropylene (i.e. random polypropylene, e.g. a random copolymer of propylene and ethylene). Examples of the composition in which the polypropylene layer 11 has the sea-island structure include compositions in which the polypropylene layer 11 contains a block copolymer of polypropylene, a block copolymer of polypropylene and a random copolymer of polypropylene, a random copolymer of polypropylene, or homopolypropylene, random polypropylene and a polyethylene component. More preferably, the polypropylene layer 11 contains block polypropylene or random polypropylene. Still more preferably, the polypropylene layer is formed of block polypropylene or random polypropylene. The ratio of propylene contained in the block polypropylene and the random polypropylene is preferably about 10 to 90% by mass, more preferably about 30 to 80% by mass.

In the adhesive film 1 for a metal terminal according to the present invention, the polypropylene layer 11 may have only one layer or two or more layers. A plurality of layers formed of the same polypropylene or different polypropylenes may be continuously laminated on the polypropylene layer 11, with the plurality of layers forming the polypropylene layer 11. Preferably, the polypropylene layer 11 contains a layer formed of block polypropylene or random polypropylene.

When the polypropylene layer 11 is formed of a single layer, the polypropylene layer 11 is preferably a layer formed of random polypropylene (random polypropylene layer) or a layer formed of block polypropylene (block polypropylene layer). When the polypropylene layer 11 is formed of a plurality of layers, the polypropylene layer is preferably a laminate of a random polypropylene layer and a block polypropylene layer, a laminate of a random polypropylene layer and a random polypropylene layer, a laminate in which a random polypropylene layer, a block polypropylene layer and a random polypropylene layer are laminated in this order, or the like.

In the present invention, when a plurality of layers formed of polypropylene are successively laminated, these layers are collectively referred to as a polypropylene layer 11. Similarly, when a plurality of layers formed of acid-modified polypropylene are successively laminated, these layers are collectively referred to as an acid-modified polypropylene layer 12.

The thickness of the polypropylene layer 11 is not particularly limited, and from the viewpoint of improving adhesion with the metal terminal in the case of coming into contact with an electrolytic solution, the lower limit of the thickness of the polypropylene layer 11 is preferably about 15 μm or more, more preferably about 20 μm or more, the upper limit of the thickness of the polypropylene layer 11 is preferably about 120 µm or less, more preferably about 100 µm or less, still more preferably about 80 µm or less, even more preferably about 70 µm or less, and the thickness of the polypropylene layer 11 is preferably in the range of about 15 to 120 µm, about 15 to 100 µm, about 15 to 80 µm, about 15 to 70 µm, about 20 to 120 µm, about 20 to 100 µm, about 20 to 80 µm or about 20 to 70 µm. While the details of the mechanism are not clear, the adhesion of the adhesive film for a metal terminal tends to be easily deteriorated when the thickness of the acid-modified polypropylene layer is too large because cohesive failure of the acid-modified polypropylene layer easily occurs.

From the viewpoint of improving adhesion with the metal terminal in the case of coming into contact with an electrolytic solution, the ratio of the thickness of the polypropylene layer 11 to the thickness of the adhesive film 1 for a metal terminal in the adhesive film 1 for the metal terminal is preferably about 40% or more, more preferably about 45% or more, and the upper limit of the ratio of the thickness of the polypropylene layer 11 to the thickness of the adhesive film 1 for a metal terminal is about 85% or less, more preferably about 80% or less. The ratio of the thickness of the polypropylene layer 11 to the thickness of the adhesive film 1 for a metal terminal is preferably about 40 to 85%, about 40 to 80%, about 45 to 85% or about 45 to 80%.

The melting peak temperature of the polypropylene layer 11 is not particularly limited as long as the melting peak temperature of the adhesive film 1 for a metal terminal as a whole is within the above-described range, and from the viewpoint of improving adhesion with the metal terminals in the case of coming into contact with an electrolytic solution, the lower limit of the melting peak temperature is preferably about 120° C. or higher, more preferably about 130° C. or higher, still more preferably about 135° C. or higher, the upper limit of the melting peak temperature is, for example, 165° C. or lower, preferably about 160° C. or lower, more preferably about 156° C. or lower, still more preferably about 150° C. or lower, especially preferably 148° C. or lower, and the melting peak temperature is preferably in the range of about 120 to 165° C., about 120 to 160° C., about 120 to 156° C., about 120 to 150° C., about 120 to 148° C., about 130 to 165° C., about 130 to 160° C., about 130 to 156° C., about 130 to 150° C., about 130 to 148° C., about 135 to 165° C., about 135 to 160° C., about 135 to 156° C., about 135 to 150° C. or about 135 to 148° C. In the present invention, the melting peak temperature of the polypropylene layer 11 is a value measured with a differential scanning calorimeter (DSC), and in the measurement, the temperature elevation rate is 10° C./min, the temperature measuring range is from −50 to 200° C., and an aluminum pan is used as a sample pan.

(Acid-Modified Polypropylene Layer 12)

In the present invention, the acid-modified polypropylene layer 12 is a layer formed of acid-modified polypropylene. It is preferable that in the acid-modified polypropylene layer 12, a sea-island structure is observed when a cross-section is observed with an electron microscope. The method for identifying a sea-island structure in the acid-modified polypropylene layer 12 is the same as the above-described identification method for the polypropylene layer 11.

In the present invention, when at least one of the polypropylene layer 11 and the acid-modified polypropylene layer 12 has the sea-island structure, the resin layer 10 having a polyolefin backbone includes a layer in which a sea-island structure is observed when a cross-section is observed with an electron microscope.

In the sea-island structure of the acid-modified polypropylene layer 12, the ratio of the area of island portions is not particularly limited, and is preferably 10 to 50%, more preferably about 15 to 40%, still more preferably about 20 to 40%, from the viewpoint of improving adhesion with the metal terminals in the case of coming into contact with an electrolytic solution. The method for measuring the ratio of the area of island portions in the sea-island structure of the acid-modified polypropylene layer 12 is the same as the above-described measurement method for the polypropylene layer 11 except that the object to be measured is the acid-modified polypropylene layer 12. When the ratio of the area of island portions is 2% or less, it is determined that there is substantially no sea-island structure.

The acid-modified polypropylene is not particularly limited as long as it is polypropylene modified with an acid, and polypropylene graft-modified with unsaturated carboxylic acid or an anhydride thereof is preferable. Examples of the unsaturated carboxylic acid or an anhydride thereof to be used for acid modification include maleic acid, acrylic acid, itaconic acid, crotonic acid, maleic anhydride and itaconic anhydride, and of these, maleic anhydride is preferable.

The polypropylene to be acid-modified is preferably crystalline or noncrystalline polypropylene such as homopolypropylene, a block copolymer of polypropylene (i.e. block polypropylene, e.g. a block copolymer of propylene and ethylene), or a random copolymer of polypropylene (i.e. random polypropylene, e.g. a random copolymer of propylene and ethylene). Of these, propylene containing a block copolymer of polypropylene or a random copolymer of polypropylene is preferable. When the polypropylene to be acid-modified is random polypropylene, the acid-modified polypropylene is a random-based acid-modified polypropylene (acid-modified polypropylene having random polypropylene as a backbone). Similarly, when the polypropylene to be acid-modified is block polypropylene, the acid-modified polypropylene is a block-based acid-modified polypropylene (acid-modified polypropylene having block polypropylene as a backbone).

Preferably, a peak derived from maleic anhydride is detected when the adhesive film for a metal terminal is analyzed by infrared spectroscopy. For example, when maleic anhydride-modified polypropylene is measured by infrared spectroscopy, peaks derived from maleic anhydride are detected near wave numbers of 1760 cm$^{-1}$ and 1780 cm$^{-1}$. For example, when the acid-modified polypropylene layer 12 is a layer formed of acid-modified polypropylene, peaks derived from maleic anhydride are detected near wave numbers of 1760 cm$^{-1}$ and 1780 cm$^{-1}$ when maleic anhydride-modified polypropylene is measured by infrared spectroscopy. By infrared spectroscopy, gas chromatography mass spectrometry or the like, the acid-modified polypropylene layer 12 can be to be a layer formed of acid-modified polypropylene, and the analysis method is not particularly limited. However, if the degree of acid modification is low, the peaks may be too small to be detected. In that case, the peaks can be analyzed by nuclear magnetic resonance spectroscopy.

In the adhesive film 1 for a metal terminal according to the present invention, the acid-modified polypropylene layer 12 may have only one layer or two or more layers. A plurality of layers formed of the same acid-modified polypropylene or different acid-modified polypropylenes may be continuously laminated on the acid-modified polypropylene layer 12, with the plurality of layers forming the acid-modified polypropylene layer 12.

Examples of the preferred aspect of the acid-modified polypropylene layer 12 include layers formed of maleic anhydride-modified polypropylene.

In particular, it is preferable that the resin layer 10 having a polyolefin backbone in the adhesive film for a metal terminal according to the present invention has a laminated configuration in which the random-based acid-modified polypropylene layer 12, the random polypropylene layer 11 and the random-based acid-modified polypropylene layer 12 are laminated in this order.

The thickness of the acid-modified polypropylene layer 12 is not particularly limited, and from the viewpoint of improving adhesion with the metal terminal in the case of coming into contact with an electrolytic solution, the lower limit of the thickness of the acid-modified polypropylene layer 12 is preferably about 10 μm or more, more preferably about 15 μm or more, the upper limit of the thickness of the polypropylene layer 12 is preferably about 50 μm or less, more preferably about 45 μm or less, still more preferably about 35 μm or less, and the thickness of the polypropylene layer 12 is preferably in the range of about 10 to 50 μm, about 10 to 45 μm, about 10 to 35 μm, about 15 to 50 μm, about 15 to 45 μm or about 15 to 35 μm.

The melting peak temperature of the acid-modified polypropylene layer 12 is not particularly limited, and from the viewpoint of improving adhesion with the metal terminals in the case of coming into contact with an electrolytic solution, the lower limit of the melting peak temperature is preferably about 120° C. or higher, more preferably about 130° C. or higher, still more preferably about 135° C. or higher, the upper limit of the melting peak temperature is, for example, 165° C. or lower, preferably about 160° C. or lower, more preferably about 156° C. or lower, still more preferably about 150° C. or lower, especially preferably 148° C. or lower, and the melting peak temperature is preferably in the range of about 120 to 165° C., about 120 to 160° C., about 120 to 156° C., about 120 to 150° C., about 120 to 148° C., about 130 to 165° C., about 130 to 160° C., about 130 to 156° C., about 130 to 150° C., about 130 to 148° C., about 135 to 165° C., about 135 to 160° C., about 135 to 156° C., about 135 to 150° C. or about 135 to 148° C. In the present invention, the melting peak temperature of the acid-modified polypropylene layer 12 is a value measured in the same manner as in the method for measuring the melting peak temperature of the polypropylene layer 11.

From the viewpoint of improving the sealing strength while suppressing the collapse of the adhesive film for a metal terminal during heat sealing, the upper limit of the absolute value of a difference between the softening point of the polypropylene layer 11 and the softening point of the acid-modified polypropylene layer 12 in the adhesive film 1 for a metal terminal according to the present invention is preferably about 40° C. or lower, more preferably about 30° C. or lower, still more preferably about 20° C. or lower, and the lower limit of the absolute value of the above-mentioned difference is preferably about 0° C. or higher, more preferably about 5° C. or higher, still more preferably about 10° C. or higher. The softening points of the polypropylene layer 11 and the acid-modified polypropylene layer 12 are values measured in the following manner.
(Method for Measuring Softening Point)

The softening point is a value measured at a temperature elevation rate of 5° C./s using a scanning thermal microscope (NanoTA manufactured by Anasys, Inc.), where the model of the cantilever of the thermal probe is EX-AN2-200. The peak top temperature is defined as a softening point.

The adhesive film 1 for a metal terminal according to the present invention may contain various additives such as a slipping agent, an antioxidant, an ultraviolet absorbent and a light stabilizer if necessary. The adhesive film 1 for a metal terminal may undergo discoloration depending on the types and contents of additives. The content of the slipping agent contained in the entire adhesive film 1 for a metal terminal is preferably about 0 to 2000 ppm.
(Measurement of Amount of Slipping Agent)

The content of the slipping agent contained in the entire adhesive film 1 for a metal terminal is a value measured using a gas chromatograph-mass spectrometer (GC-MS). Specifically, in boiled and refluxed methanol, the additive in the adhesive film for a metal terminal is extracted into the methanol, and the resulting methanol extract is analyzed by GC-MS to analyze the amount of the slipping agent contained in the entire adhesive film for a metal terminal.

The slipping agent is not particularly limited, and is preferably an amide-based slipping agent. Specific examples of the amide-based slipping agent include saturated fatty acid amides, unsaturated fatty acid amides, substituted amides, methylol amides, saturated fatty acid bisamides, unsaturated fatty acid bisamides, fatty acid ester amides and aromatic bisamides. Specific examples of the saturated fatty acid amide include lauric acid amide, palmitic acid amide, stearic acid amide, behenic acid amide, and hydroxystearic acid amide. Specific examples of unsaturated fatty acid amide include oleic acid amide and erucic acid amide. Specific examples of the substituted amide include N-oleylpalmitic acid amide, N-stearyl stearic acid amide, N-stearyl oleic acid amide, N-oleyl stearic acid amide and N-stearyl erucic acid amide. Specific examples of the methylolamide include methylolstearic acid amide. Specific examples of the saturated fatty acid bisamide include methylenebisstearic acid amide, ethylenebiscapric acid amide, ethylenebislauric acid amide, ethylenebisstearic acid amide, ethylenebishydroxystearic acid amide, ethylenebisbehenic acid amide, hexamethylenebisstearic acid amide, hexamethylenehydroxystearic acid amide, N,N'-distearyl adipic acid amide and N,N'-distearyl sebacic acid amide. Specific examples of the unsaturated fatty acid bisamide include ethylenebisoleic acid amide, ethylenebiserucic acid amide, hexamethylenebisoleic acid amide, N,N'-dioleyladipic acid amide and N,N'-dioleylsebacic acid amide. Specific examples of the fatty acid ester amide include stearoamideethyl stearate. Specific examples of the aromatic bisamide include m-xylylenebisstearic acid amide, m-xylylenebishydroxystearic acid amide and N,N'-distearylisophthalic acid amide. The slipping agents may be used alone, or may be used in combination of two or more thereof.

The adhesive film 1 for a metal terminal according to the present invention may contain a filler if necessary. When the adhesive film 1 for a metal terminal contains a filler, the filler functions as a spacer, so that a short-circuit between the metal terminal 2 and the barrier layer 33 of the packaging material 3 can be further effectively suppressed. The particle size of the filler is preferably in the range of about 0.1 to 35 μm, preferably about 5.0 to 30 μm, more preferably about 10 to 25 μm. When a filler is added to the adhesive film 1 for a metal terminal, it is preferable that the filler is contained in the resin layer 10 having a polyolefin backbone, and the content of the filler is about 5 to 30 parts by mass, preferably about 10 to 20 parts by mass based on 100 parts by mass of a resin component forming the resin layer 10 having a polyolefin backbone.

As the filler, either an inorganic filler or an organic filler can be used. Examples of the inorganic filler include carbon (carbon and graphite), silica, aluminum oxide, barium titanate, iron oxide, silicon carbide, zirconium oxide, zirconium silicate, magnesium oxide, titanium oxide, calcium aluminate, calcium hydroxide, aluminum hydroxide, magnesium hydroxide and calcium carbonate. Examples of the organic filler include fluororesins, phenol resins, urea resins, epoxy resins, acrylic resins, benzoguanamine-formaldehyde condensates, melamine-formaldehyde condensates, polymethylmethacrylate crosslinked products and polyethylene crosslinked products. From the viewpoint of shape stability, rigidity, and resistance to contents, aluminum oxide, silica, fluororesins, acrylic resins, and benzoguanamine-formaldehyde condensates are preferable, and of these, in particular, spherical aluminum oxide and silica are more preferable. As a method for mixing a filler with a resin component forming the resin layer 10 having a polyolefin backbone, for example, a method can be employed in which the filler and the resin component are melt-blended with a Banbury mixer or the like to form a masterbatch, which is then adjusted to a predetermined mixing ratio, or the filler is directly mixed with the resin component.

The adhesive film 1 for a metal terminal may contain a pigment if necessary. As the pigment, various inorganic pigments can be used. Specific examples of the pigment include carbon (carbon and graphite) exemplified for the filler, and titanium oxide. Carbon (carbon and graphite) is a material which is commonly used in a battery, and there is no risk of elution of carbon into an electrolytic solution. In addition, the coloring effect is high enough to obtain a sufficient coloring effect with an addition amount that does not cause hindrance to bondability, melting with heat does not occur, and the apparent melt viscosity of a resin added can be increased. Further, deterioration of the sealing strength can be prevented by preventing thinning of a pressurized portion during thermal bonding (during sealing).

When a pigment is added to the adhesive film 1 for a metal terminal, it is preferable that the pigment is contained in the resin layer 10 having a polyolefin backbone, and for example, when carbon black with a particle diameter of about 0.03 μm is used, the content of the pigment is about 0.05 to 0.3 parts by mass, preferably about 0.1 to 0.2 parts by mass based on 100 parts by mass of a resin component forming the resin layer 10 having a polyolefin backbone. By adding a pigment to the adhesive film 1 for a metal terminal, whether the adhesive film 1 for a metal terminal is present or not can be checked with a sensor, or visually. When the resin layer 10 having a polyolefin backbone includes the polypropylene layer 11 and the acid-modified polypropylene layer 12, and a filler and a pigment are added, the filler and the pigment may be added to one layer, and from the viewpoint of preventing hindrance to the heat-sealability of the adhesive film 1 for a metal terminal, it is preferable that the filler and the pigment are added to, for example, the polypropylene layer 11 and the acid-modified polypropylene layer 12, respectively, or vice versa.

The adhesive film 1 for a metal terminal according to the present invention can be produced by preparing the resin layer 10 having a polyolefin backbone. For example, when the resin layer 10 having a polyolefin backbone includes at least one polypropylene layer and at least one acid-modified polypropylene layer, the adhesive film for a metal terminal can be produced by laminating these layers. The method for laminating at least one polypropylene layer and at least one acid-modified polypropylene layer is not particularly limited, and for example, a thermal lamination method, a sandwich lamination method, an extrusion lamination method, or the like can be used.

[Support Member]

The adhesive film 1 for a metal terminal according to the present invention may further include a support member (not shown) in addition to the resin layer 10 having a polyolefin backbone. The support member is a layer that functions as a support for the adhesive film 1 for a metal terminal.

Examples of the support member include a fibrous sheet. Examples of the fibrous sheet include nonwoven fabrics, meshes and woven fabrics. The fibrous sheets may be used alone, or may be used in combination of two or more thereof.

The fiber that forms the nonwoven fabric is not particularly limited, and natural fibers such as fibers of cellulose, wool, silk, cotton and linen, glass fibers, carbon fibers, rock fibers, and chemical fibers obtained by fiberizing heat-resistant synthetic resins such as polyester, aromatic polyester-based resins (liquid crystal polymers), polyimide, polymethylpentene, polyarylate, polyphenylene oxide, polysulfone, polyether ether ketone and polyphenylene sulfide. Of these, polyarylate having high heat resistance and high electrolytic solution resistance property is preferable.

Preferably, the fibrous sheet is formed of fiber having a fiber diameter within the range of 1.9 to 18.2 μm. The fibrous sheet may be formed of fiber having a single fiber diameter, or may be a mixture of fibers having a plurality of fiber diameters.

The thickness of the support member is not particularly limited, and is preferably about 20 to 80 μm, more preferably about 35 to 70 μm. When the support member is formed of a fibrous sheet, the mass per unit areal of the support member is preferably about 5 to 30 g/m$^2$, more preferably about 10 to 20 g/m$^2$.

When a support member is used, the adhesive film 1 for a metal terminal according to the present invention can be produced by laminating the support member and the resin layer 10 having a polyolefin backbone. For example, the resin layer 10 having a polyolefin backbone can be brought into close contact with the support member by laminating the support member and the resin layer 10 having a polyolefin backbone while a resin forming the resin layer 10 is in a molten state. When the support member is a fibrous sheet, the support member can be impregnated with a resin forming the resin layer 10 having a polyolefin backbone while the resin is in a molten state.

The method for interposing the adhesive film 1 for a metal terminal between the metal terminal 2 and the packaging material 3 is not particularly limited, and for example, as shown in FIGS. 1 to 3, the adhesive film 1 for a metal terminal may be wound around the metal terminal 2 at a portion where the metal terminal 2 is sandwiched by the packaging material 3. The adhesive film 1 for a metal terminal may be disposed on both sides of the metal terminal 2 so as to traverse two metal terminals 2 at a portion where the metal terminal 2 is sandwiched by the packaging material 3 (not shown).

[Metal Terminal 2]

The adhesive film 1 for a metal terminal according to the present invention is interposed between the metal terminals 2 and the packaging material 3. The metal terminal 2 (tab) is a member electrically connected to an electrode (positive or negative electrode) of the battery element 4, and is formed of a metal material. The metal material that forms the metal terminal 2 is not particularly limited, and examples thereof include aluminum, nickel and copper. For example, the metal terminal 2 connected to a positive electrode of a lithium ion battery is typically formed of aluminum or the like. The metal terminal connected to a negative electrode of a lithium ion battery is typically formed of copper, nickel or the like.

Preferably, the surface of the metal terminal 2 is subjected to chemical conversion treatment from the viewpoint of improving electrolytic solution resistance. For example, when the metal terminal 2 is formed of aluminum, specific examples of the chemical conversion treatment include known methods including forming an acid-resistant film such as a film of a phosphate, a chromate, a fluoride and a triazine thiol compound. Of the methods for forming an acid-resistant film, phosphoric acid chromate treatment using a material formed of three components, which are a phenol resin, a chromium (III) fluoride compound and phosphoric acid, is preferable.

The size of the metal terminal 2 may be appropriately set according to the size of a battery used, etc. The thickness of the metal terminal 2 is preferably about 50 to 1,000 µm, more preferably about 70 to 800 µm. The length of the metal terminal 2 is preferably about 1 to 200 mm, more preferably about 3 to 150 mm. The width of the metal terminal 2 is preferably about 1 to 200 mm, more preferably about 3 to 150 mm.

[Metal Terminal with Adhesive Film]

The metal terminal with an adhesive film according to the present invention includes the metal terminal 2, and the adhesive film 1 for a metal terminal which covers a part of the metal terminal 2. As described above, the adhesive film for a metal terminal is interposed between the metal terminal 2 and the packaging material 3. In the metal terminal with an adhesive film of the present invention, a part of the metal terminal 2 is covered with the adhesive film 1 for a metal terminal in advance. The portion where the metal terminal 2 is covered with the adhesive film 1 for a metal terminal is located at a position corresponding to the portion where the metal terminal 2 is sandwiched by the packaging material 3. Preferably, the adhesive film 1 for a metal terminal is wound around the metal terminals 2.

[Packaging Material 3]

Figure 6:
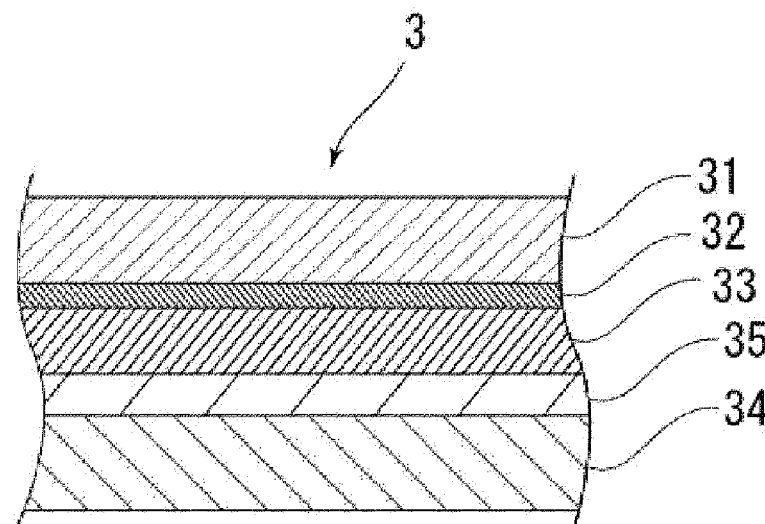
FIG. 6 is a schematic sectional view of a battery packaging material which is used for the battery of the present invention.

Examples of the packaging material 3 include materials having a laminated structure with a laminated sheet including at least a base material layer 31, a barrier layer 33 and a heat-sealable resin layer 34 in this order. FIG. 6 shows an aspect in which the base material layer 31, an adhesive agent layer 32, the barrier layer 33, an adhesive layer 35 and the heat-sealable resin layer 34 are laminated in this order as an example of a cross-sectional structure of the packaging material 3. The adhesive agent layer 32 is a layer provided if necessary for the purpose of, for example, enhancing adhesion between the base material layer 31 and the barrier layer 33. The adhesive layer 35 is a layer provided if necessary for the purpose of, for example, enhancing adhesion between the barrier layer 33 and the heat-sealable resin layer 34.

In the packaging material 3, the base material layer 31 is an outermost layer, and the heat-sealable resin layer 34 is an innermost layer. During construction of a battery, the heat-sealable resin layer 34 situated on the peripheral edge of the battery element 4 is brought into contact with itself, and heat-welded to hermetically seal the battery element 4, so that the battery element 4 is encapsulated. FIGS. 1 to 3 show a battery 40 with the embossed packaging material 3 formed by embossing or the like, but the packaging material 3 may be an unmolded pouch type packaging material. The pouch type may be any of a three-side seal type, a four-side seal type, a pillow type and the like.

[Base Material Layer 31]

In the packaging material 3, the base material layer 31 is a layer that functions as a base material of the packaging material, and forms the outermost layer side. The material that forms the base material layer 31 is not particularly limited as long as it has an insulation quality. Examples of the material that forms the base material layer 31 include polyester, polyamide, epoxy resins, acrylic resins, fluororesins, polyurethane, silicone resins, phenol resins, polyether imide, polyimide, and mixtures and copolymers thereof.

The thickness of the base material layer 31 is, for example, about 10 to 50 µm, preferably about 15 to 30 µm.

[Adhesive Agent Layer 32]

In the packaging material 3, the adhesive agent layer 32 is a layer that is disposed on the base material layer 31 if necessary for imparting adhesion to the base material layer 31. That is, the adhesive agent layer 32 is provided between the base material layer 31 and the barrier layer 33 if necessary.

The adhesive agent layer 32 is formed from an adhesive capable of bonding the base material layer 31 and the barrier layer 33. The adhesive used for forming the adhesive agent layer 32 may be a two-liquid curable adhesive, or may be a one-liquid curable adhesive. The adhesive used for forming the adhesive agent layer 32 is not particularly limited, and may be any one of a chemical reaction type, a solvent volatilization type, a heat melting type, a heat pressing type and so on.

The thickness of the adhesive agent layer 32 is, for example, about 2 to 50 µm, preferably about 3 to 25 µm.

[Barrier Layer 33]

In the packaging material, the barrier layer 33 is a layer which is intended to improve the strength of the battery packaging material and which has a function of preventing ingress of water vapor, oxygen, light and the like into the battery. Specific examples of the metal forming the barrier layer 33 include aluminum, stainless and titanium, with aluminum being preferred. The barrier layer 33 can be formed from, for example, a metal foil, a metal vapor-deposited film, an inorganic oxide vapor-deposited film, a carbon-containing inorganic oxide vapor-deposited film, a film provided with any of these vapor-deposited films, or the like, and is formed preferably from a metal foil, more preferably from an aluminum alloy foil. From the viewpoint of preventing generation of wrinkles and pinholes in the barrier layer 33 during manufacturing of the battery packaging material, it is more preferred to form the barrier layer from a soft aluminum alloy foil such as annealed aluminum (JIS H4160: 1994 A8021H-O, JIS H4160: 1994 A8079H-O, JIS H4000: 2014 A8021P-O, JIS H4000: 2014 A8079P-O).

A corrosion-resistant film may be provided on at least one surface of the barrier layer 33.

While the thickness of the barrier layer 33 is not particularly limited as long as a function as a barrier layer to water vapor is performed, it may be, for example, about 10 to 50 µm, preferably about 10 to 40 µm.

[Adhesive Layer 35]

In the packaging material 3, the adhesive layer 35 is a layer that is provided between the barrier layer 33 and the heat-sealable resin layer 34 if necessary for strongly bonding the heat-sealable resin layer 34.

The adhesive layer 35 is formed of an adhesive capable of bonding the barrier layer 33 and the heat-sealable resin layer 34 to each other. The composition of the adhesive used for forming the adhesive layer is not particularly limited, and examples thereof include resin compositions containing an acid-modified polyolefin. Examples of the acid-modified polyolefin include acid-modified polyolefins identical to those described for the acid-modified polypropylene layer 12. In addition, examples of the acid-modified polyolefin include polyethylene such as low-density polyethylene, medium-density polyethylene, high-density polyethylene and linear low-density polyethylene modified with an acid such as an unsaturated carboxylic acid or an anhydride thereof (e.g. those exemplified in the acid-modified polypropylene layer 12). The thickness of the adhesive layer 35 is, for example, about 1 to 40 µm, preferably about 2 to 30 µm.

[Heat-Sealable Resin Layer 34]

In the packaging material 3, the heat-sealable resin layer 34 corresponds to the innermost layer, and during construction of a battery, the heat-sealable resin layer is heat-welded to itself to hermetically seal the battery element.

The resin component to be used in the heat-sealable resin layer 34 is not particularly limited as long as it can be heat-sealed, and examples thereof include polyolefins and acid-modified polyolefins.

Examples of the polyolefin include polyolefins identical to those exemplified for the polypropylene layer 11, and polyethylene such as low-density polyethylene, medium-density polyethylene, high-density polyethylene and linear low-density polyethylene. Examples of the acid-modified polyolefin include acid-modified polyolefins identical to those described for the adhesive layer 35.

The thickness of the heat-sealable resin layer 34 is not particularly limited, and is preferably about 2 to 2000 µm, more preferably about 5 to 1000 µm, still more preferably about 10 to 500 µm.

2. Battery 40

The battery 40 of the present invention includes at least the battery element 4 including a positive electrode, a negative electrode and an electrolyte, the packaging material 3 sealing the battery element 4, and the metal terminal 2 which is electrically connected to each of the positive electrode and the negative electrode, and protrudes outside the packaging material 3. In the battery 40 of the present invention, the adhesive film 1 for a metal terminal according to the present invention is interposed between the metal terminal 2 and the packaging material 3.

Specifically, the battery element 4 including at least a positive electrode, a negative electrode and an electrolyte is covered with the packaging material 3 such that the adhesive film 1 for a metal terminal according to the present invention is interposed between the metal terminal 2 and the heat-sealable resin layer 34 to enable formation of a flange portion of the packaging material (a region where the heat-sealable resin layer 34 is in contact with itself, i.e. a peripheral edge portion 3a of the packaging material) on the peripheral edge of the battery element 4 while the metal terminal 2 connected to each of the positive electrode and the negative electrode protrudes to the outside, and the heat-sealable resin layer 34 at the flange portion is heat-sealed with itself to provide the battery 40 with the packaging material 3. When the battery element 4 is stored using the packaging material 3, the packaging material 3 is used such that the heat-sealable resin layer 34 is on the inner side (surface contacting the battery element 4).

The battery of the present invention may be a primary battery or a secondary battery, and is preferably a secondary battery. The type of a secondary battery is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Of these secondary batteries, lithium ion batteries and lithium ion polymer batteries are preferable.

When the thickness of a portion where the packaging material, the adhesive film for a metal terminal and the metal terminal are laminated in each of the packaging material, the metal terminal and the adhesive film for a metal terminal, which form the battery, the thickness of the packaging material is preferably about 10 to 65 µm, the thickness of the metal terminal is about 50 to 1,000 µm, the adhesive film for a metal terminal is about 30 to 80 µm, and the sum of the preferred thickness of the packaging material and the preferred thickness of the adhesive film for a metal terminal is about 40 to 145 µm.

EXAMPLES

Hereinafter, the present invention will be described in detail by way of examples and comparative examples. It is to be noted, however, that the present invention is not limited to the examples. In measurement of the melting peak temperature as described below, the measured value was rounded off to the nearest integer. In each of measurement of the sealing strength after immersion in an electrolytic solution, measurement of the heat shrinkage ratio, measurement of the thickness residual ratio of the adhesive film for a metal terminal, measurement of the surface roughness (arithmetic mean roughness Ra), and measurement of the ratio of the area of island portions in a sea-island structure as described below, the measured value was rounded off to one decimal place.

In Examples and Comparative Examples, evaluation in each of measurement of the melting peak temperature, measurement of the heat shrinkage ratio, measurement of the sealing strength after immersion in an electrolytic solution, measurement of the thickness residual ratio, and measurement of the electrolytic solution resistance and the ratio of the area of island portions in a sea-island structure was performed in the following manner. The results are shown in Tables 1 and 2.

(Measurement of Melting Peak Temperature)

The adhesive film for a metal terminal was measured with a differential scanning calorimeter (DSC). As an apparatus, "DSC-60 Plus" from Shimadzu Corporation was used. As measurement conditions, the temperature elevation rate was 10° C./min, the temperature measurement range was from −50 to 200° C., and an aluminum pan was used as a sample pan.

(Measurement of Heat Shrinkage Ratio)

The adhesive film for a metal terminal was cut to a size of 50 mm (MD)×4 mm (TD) in length to obtain a test piece. Next, a length M (mm) of the test piece was measured with a metal scale. Next, the end part (about 1 mm) of the test piece in a length direction was fixed to a wire mesh with a tape, so that the test piece was hung from the wire mesh. In this state, the test piece was placed in an oven heated to 190° C. for 120 seconds, and the test piece was taken out together with the wire mesh, and naturally cooled in an environment of room temperature (25° C.). Next, a length N (mm) of the test piece naturally cooled to room temperature was measured with a metal scale. The heat shrinkage ratio of the adhesive film for a metal terminal was calculated from the following equation.

$$\text{Heat shrinkage ratio (\%)} = (1 - (\text{length } N/\text{length } M)) \times 100$$

(Evaluation of Electrolytic Solution Resistance)

The adhesive film for a metal terminal was cut to a size of 15 mm (MD)×100 mm (TD) in length to obtain a test piece. Next, the test piece was immersed in an electrolytic solution (1M LiPF$_6$ solution (ethylene carbonate:dimethyl carbonate:diethyl carbonate=1:1:1, volume ratio)) and stored in an oven at 85° C. for 24 hours. Next, the test piece was taken out, washed with water, and the test piece then was visually observed. A test piece which was not delaminated was rated "A", and a test piece which was delaminated was rated "C"

(Measurement of Sealing Strength after Immersion in Electrolytic Solution)

Figure 7:
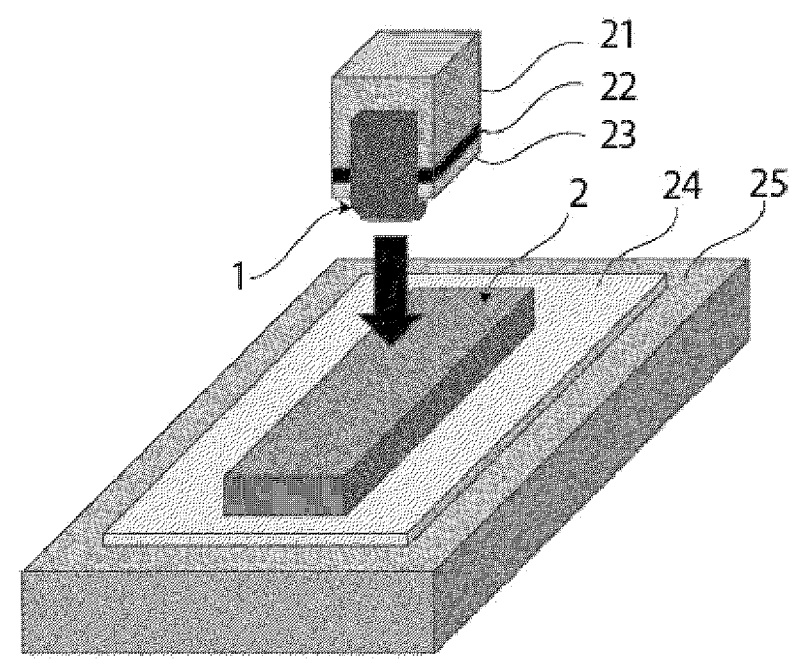
FIG. 7 is a schematic diagram for illustrating a method for measuring sealing strength after immersion in an electrolytic solution in an example.
Figure 8:
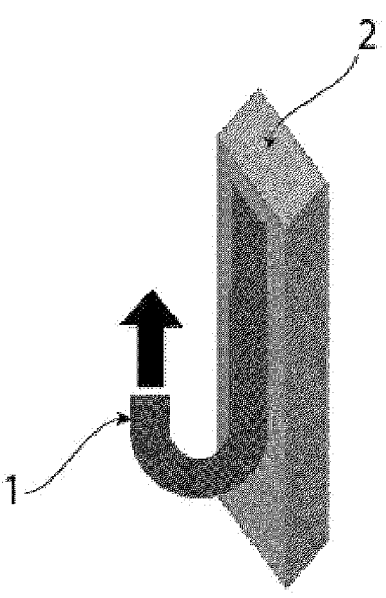
FIG. 8 is a schematic diagram for illustrating a method for measuring sealing strength after immersion in an electrolytic solution in an example.

An adhesive film 1 for a metal terminal was cut to a size of 50 mm in length (MD) and 10 mm in width (TD). In addition, a metal terminal 2 (aluminum plate, length: 60 mm, width: 22.5 mm, thickness: 0.3 mm) was prepared. Next, as shown in the schematic view of FIG. 7, a 2 mm-thick aluminum plate 24 was placed on a hot plate 25, and the metal terminal 2 was placed on the aluminum plate 24. Next, the metal terminal 2 was heated to 190° C. by heating the hot plate 25. Next, as shown in FIG. 7, the adhesive film 1 for a metal terminal was pressed to the metal terminal 2 with a laminate of a brass block 21, a silicone rubber 22, and a Teflon (registered trademark) cloth 23 under the conditions of a surface pressure of 0.0082 MPa and 10 seconds to heat-weld the adhesive film 1 for a metal terminal on a surface of the metal terminal 2. In this way, a laminate was obtained. Next, the laminate was immersed in an electrolytic solution (1M LiPF$_6$ solution (ethylene carbonate:dimethyl carbonate:diethyl carbonate=1:1:1 in terms of volume ratio), moisture content: 1,000 ppm) and stored in an oven at 85° C. for 72 hours. Next, the laminate was taken out from the electrolytic solution, washed with water and dried. Thereafter, as shown in the schematic view of FIG. 8, the adhesive film 1 for a metal terminal was peeled from the metal terminal 2 of the obtained laminate in a length direction (MD) at a tensile speed of 175 mm/min to measure the sealing strength (N/10 mm) after immersion in electrolytic solution. The results are shown in Table 1.

(Measurement of Thickness Residual Ratio of Adhesive Film for Metal Terminal)

An aluminum plate (pure aluminum, JIS H4160-1994 A1N30H-O) with a length of 60 mm, a width of 25 mm and a thickness of 100 μm and the adhesive film for a metal terminal with a length of 70 mm and a width of 5 mm were prepared. Next, The thickness A (μm) of the adhesive film for a metal terminal was measured with a micro-gauge. Next, the adhesive film for a metal terminal was stacked on a central portion of the aluminum plate in such a manner that the length direction and the width direction of the aluminum plate were coincident, respectively, with the length direction and the width direction of the adhesive film for a metal terminal. A polyethylene terephthalate film having a thickness of 12 μm was disposed on the adhesive film for a metal terminal. Next, two 7 mm-wide metal plates larger in length than the aluminum plate were prepared, heating and pressurization were then performed from above and below the adhesive film for a metal terminal in such a manner as to cover the entire surface of the adhesive film for a metal terminal under the conditions of 190° C., a surface pressure of 1.27 MPa and a time of 3 seconds, and the polyethylene terephthalate film was peeled from the laminate to obtain a laminate of the aluminum plate and the adhesive film for a metal terminal. Next, a thickness B (μm) of a portion heated and pressurized of the laminate was measured with a micro-gauge. A thickness residual ratio of the adhesive film for a metal terminal was calculated from the following equation. Here, the thickness B was an average for three positions with one at a center part of the laminate and two at 10 mm from both end parts (both end parts of a portion where the aluminum plate and the adhesive film for a metal terminal are laminated) toward the center part in a length direction of the laminate.

$$\text{thickness residual ratio of adhesive film for a metal terminal}(\%)=(\text{thickness } B-100)/\text{thickness } A\times100.$$

<Method for Measuring Ratio of Area of Island Portions in Sea-Island Structure>

The adhesive film for a metal terminal was embedded in a thermosetting epoxy resin, and curing was performed. A cross-section extending in an intended direction (cross-section along TD) was prepared using a commercially available rotary microtome (EM UC6 manufactured by Leica) and a glass knife. The film as well as the embedding resin was stained with ruthenium tetroxide overnight. Since after the staining, the resin expanded, so that it was not possible to identify a sea-island structure near the cross-section, the expanded portion was trimmed with a microtome. Subsequently, a cut was made to about 1 μm to 2 μm with a diamond knife, followed by observing the cross-section. The stained cross-section was observed with a field emission scanning electron microscope (S-4800 TYPE1 manufactured by Hitachi High-Tech Corporation, measurement conditions: 3 kV 20 mA High WD6 mm detector (Upper)), and an image (magnification is 10,000 times) was acquired. Next, using image processing software capable of binarizing an image (image analysis software WinROOF (Ver 7.4) from MITANI CORPORATION), island portions and sea portions of the sea-island structure in the image were binarized to determine the ratio of the area of island portions (total area of island portions/area of image measured). Specific image processing conditions are as follows. In this measurement, island portions were stained more than sea portions, and therefore the island portions looked brighter than the sea portions.

[Image Processing Conditions]

3×3 pix averaging

Binarization: Automatic binarization

Isolated point removal: An object or background consisting of 1 pixel is removed Deletion: A shape characteristic value or a concentration characteristic value is determined, and particles are deleted (an area of 0.005 μm$^2$ is considered as a noise).

<Method for Measuring Surface Roughness (Arithmetic Mean Roughness Ra)>

The arithmetic mean roughness Ra of one surface of the adhesive film for a metal terminal was measured by the method specified in JIS B 0601:2013.

Production of Adhesive Film for Metal Terminal

Example 1

An unstretched polypropylene film (CPP) with a block polypropylene layer (60 μm, melting peak temperatures: 121° C. and 159° C.) was prepared as a polypropylene layer. Next, block-based maleic anhydride-modified polypropylene (20 μm, melting peak temperature 157° C.) was laminated on each of both surfaces of the unstretched polypropylene film by an extrusion lamination method to produce an adhesive film for a metal terminal in which an acid-modified polypropylene layer (20 μm), a polypropylene layer (60 μm) and an acid-modified polypropylene layer (20 μm) are laminated in this order.

Example 2

As a polypropylene layer, an unstretched polypropylene film (CPP, total thickness: 30 μm, melting peak temperature: 155° C.) with a three-layer configuration in which a random polypropylene layer (4 μm), a block polypropylene layer (22 μm) and a random polypropylene layer (4 μm) is laminated in this order was prepared. Next, block-based maleic anhydride-modified polypropylene (16 μm, melting peak temperature 157° C.) was laminated on each of both surfaces of the unstretched polypropylene film by an extrusion lamination method to produce an adhesive film for a metal terminal in which an acid-modified polypropylene layer (16 μm), a polypropylene layer (30 μm) and an acid-modified polypropylene layer (16 μm) are laminated in this order.

Example 3

A liquid crystal polymer nonwoven fabric (mass per unit area: 14 g/m²) was prepared. Next, random-based maleic anhydride-modified polypropylene (44 μm, melting peak temperature 140° C.) was laminated on each of both surfaces of the liquid crystal polymer nonwoven fabric by an extrusion lamination method to produce an adhesive film for a metal terminal (total thickness: 100 μm) in which an acid-modified polypropylene layer (44 μm), a liquid crystal polymer nonwoven fabric (mass per unit area: 14 g/m²) and an acid-modified polypropylene layer (44 μm) are laminated in this order.

Example 4

An unstretched polypropylene film (CPP) with a block polypropylene layer (80 μm, melting peak temperatures: 121° C. and 159° C. (CPP)) was prepared as a polypropylene layer. Next, block-based maleic anhydride-modified polypropylene (35 μm, melting peak temperature 140° C.) was laminated on each of both surfaces of the unstretched polypropylene film by an extrusion lamination method to produce an adhesive film for a metal terminal in which an acid-modified polypropylene layer (35 μm), a polypropylene layer (80 μm) and an acid-modified polypropylene layer (35 μm) are laminated in this order.

Example 5

Random-based acid-modified polypropylene (melting peak temperature: 140° C.) and random polypropylene (melting peak temperature: 142° C.) were co-extruded with a T-die type film formation machine so as to laminate an acid-modified polypropylene layer (25 μm), a polypropylene layer (100 μm) and an acid-modified polypropylene layer (25 μm) in this order. In this way, an adhesive film for a metal terminal was produced.

Example 6

Random-based acid-modified polypropylene (melting peak temperature: 135° C.) and random polypropylene (melting peak temperature: 142° C.) were co-extruded with a T-die type film formation machine so as to laminate an acid-modified polypropylene layer (25 μm), a polypropylene layer (100 μm) and an acid-modified polypropylene layer (25 μm) in this order. In this way, an adhesive film for a metal terminal was produced.

Example 7

Random-based acid-modified polypropylene (melting peak temperature: 140° C.) and homopolypropylene (melting peak temperature: 160° C.) were co-extruded with a T-die type film formation machine so as to laminate an acid-modified polypropylene layer (25 μm), a homopolypropylene layer (100 μm) and an acid-modified polypropylene layer (25 μm) in this order. In this way, an adhesive film for a metal terminal was produced.

Example 8

Acid-modified polypropylene (melting peak temperature: 140° C.) and block polypropylene (melting peak temperature: 164° C.) were co-extruded with a T-die type film formation machine so as to laminate an acid-modified polypropylene layer (35 μm), a polypropylene layer (80 μm) and an acid-modified polypropylene layer (35 μm) in this order. In this way, an adhesive film for a metal terminal was produced.

Comparative Example 1

As a polypropylene layer, a stretched polypropylene film (OPP, homopolypropylene, thickness: 50 μm, melting peak temperature: 165° C.) was prepared. Next, block-based maleic anhydride-modified polypropylene (melting peak temperature 157° C.) was laminated on each of both surfaces of the stretched polypropylene film by an extrusion lamination method to produce an adhesive film for a metal terminal in which an acid-modified polypropylene layer (25 μm), a polypropylene layer (50 μm) and an acid-modified polypropylene layer (25 μm) are laminated in this order.

(Production of Packaging Material)

An aluminum foil (thickness: 40 μm) was prepared in which both surfaces were subjected to a chemical conversion treatment (phosphoric acid chromate treatment) with a chemical conversion treatment liquid composed of three components of a phenol resin, a chromium fluoride (trivalent) compound and phosphoric acid. Next, one surface of the aluminum foil and a biaxially stretched nylon film (thickness: 25 μm) were laminated with a urethane-based adhesive interposed therebetween. Next, the other surface of the aluminum foil and an unstretched polypropylene film (thickness: 30 μm) were sandwich-laminated with an acid-modified polypropylene resin (thickness: 15 μm, polypropylene graft-modified with an unsaturated carboxylic acid), and heated to a temperature equal to or higher than the softening point of the acid-modified polypropylene resin with hot air to produce a packaging material in which a biaxially stretched nylon film (25 μm), and aluminum foil (thickness: 40 μm), an acid-modified polypropylene resin (thickness: 15 μm) and an unstretched polypropylene film (15 μm) are laminated in this order.

TABLE 1

| | Melting peak temperature (° C.) | Electrolytic solution resistance | Sealing strength after immersion in electrolytic solution (N/10 mm) | Heat shrinkage ratio (%) | Thickness residual ratio (%) | Surface roughness Ra (μm) |
|---|---|---|---|---|---|---|
| Example 1 | 121, 157, 159 | A | 11.0 | 81.5 | 63.0 | 3.6 |
| Example 2 | 155, 157 | A | 8.3 | 88.5 | 71.5 | 3.6 |
| Example 3 | 140 | A | 10.0 | 0.9 | 79.8 | 1.9 |
| Example 4 | 121, 140, 159 | A | 16.7 | 67.5 | 41.9 | 3.6 |
| Example 5 | 140, 142 | A | 25.9 | 80.3 | 46.0 | 14.9 |
| Example 6 | 135, 142 | A | 22.9 | 83.7 | 53.7 | 14.9 |
| Example 7 | 140, 160 | A | 29.7 | 43.0 | 45.9 | 14.9 |
| Example 8 | 140, 164 | A | 19.4 | 17.2 | 51.5 | 1.9 |
| Comparative Example 1 | 157, 165 | C | 0.0 | — | 59.3 | — |

TABLE 2

| | Ratio of area of island portions after binarization of sea-island structure (%) | |
|---|---|---|
| | PPa layer | PP layer |
| Example 1 | 24.7 | 28.1 |
| Example 2 | 27.1 | 29.6 |
| Example 8 | 17.4 | 18.6 |
| Comparative Example 1 | 26.6 | 1.6 |

In Tables 1 and 2, PP means polypropylene, and PPa means acid-modified polypropylene. When a plurality of values are shown as the melting peak temperature in Table 1, this means that a plurality of melting peaks were observed in the adhesive film for a metal terminal, and for example, in Example 1, melting peaks of 121° C., 157° C. and 159° C. were observed.

As shown in Table 1, all of the adhesive films for a metal terminal in Examples 1 to 9, which include at least one resin layer having a polyolefin backbone and have a melting peak within the range of 120° C. or higher and 156° C. or lower when measured with a differential scanning calorimeter, were excellent in electrolytic solution resistance, and had high sealing strength after immersion in an electrolytic solution (i.e. high adhesion after immersion in an electrolytic solution).

DESCRIPTION OF REFERENCE SIGNS

1: Adhesive film for metal terminal
2: Metal terminal
3: Packaging material
3a: Peripheral edge portion of packaging material
4: Battery element
10: Resin layer having polyolefin backbone
11: Polypropylene layer
12: Acid-modified polypropylene layer
21: Brass block
22: Silicone rubber
23: Teflon (registered trademark) cloth
24: Aluminum plate
25: Hot plate
31: Base material layer
32: Adhesive agent layer
33: Barrier layer
34: Heat-sealable resin layer
35: Adhesive layer
40: Battery

The invention claimed is:

1. An adhesive film for a metal terminal which is interposed between the metal terminal electrically connected to an electrode of a battery element and a packaging material sealing the battery element, wherein:

the adhesive film for a metal terminal comprises at least one resin layer having a polyolefin backbone, the adhesive film for a metal terminal has a melting peak within the range of 120° C. or higher and 156° C. or lower when measured with a differential scanning calorimeter, and a surface roughness of the adhesive film for a metal terminal on one side is between 10 μm and 50 μm.

2. The adhesive film for a metal terminal according to claim 1, wherein the resin layer having a polyolefin backbone includes a layer in which a sea-island structure is observed when a cross-section is observed with an electron microscope.

3. The adhesive film for a metal terminal according to claim 1, wherein the adhesive film for a metal terminal has a thickness residual ratio of 40% or more, the thickness residual ratio being measured by a measurement method including:

preparing an aluminum plate having a thickness of 100 μm and the adhesive film for a metal terminal;

measuring a thickness A (μm) of the adhesive film for a metal terminal;

stacking the adhesive film for a metal terminal on a central portion of the aluminum plate in such a manner that a length direction and a width direction of the aluminum plate are coincident, respectively, with a length direction and a width direction of the adhesive film for a metal terminal;

disposing a polyethylene terephthalate film having a thickness of 12 μm on the adhesive film for a metal terminal;

preparing two 7 mm-wide metal plates larger in length than the aluminum plate, performing heating and pressurizing with the metal plates from above and below the aluminum plate and the adhesive film for a metal terminal in such a manner as to cover an entire surface of the adhesive film for a metal terminal under conditions of 190° C., a surface pressure of 1.27 MPa and a time of 3 seconds, and peeling the polyethylene terephthalate film from the adhesive film for a metal terminal to obtain a laminate of the aluminum plate and the adhesive film for a metal terminal;

measuring a thickness B (μm) of a portion heated and pressurized of the laminate; and calculating a thickness residual ratio of the adhesive film for a metal terminal from the following equation:

$$\text{thickness residual ratio of adhesive film for a metal terminal}(\%)=(\text{thickness } B-100)/\text{thickness } A\times100.$$

4. The adhesive film for a metal terminal according to claim 1, wherein a heat shrinkage ratio of the adhesive film for a metal terminal in a flow direction is 40% or more and 95% or less.

5. The adhesive film for a metal terminal according to claim 1, wherein a peak derived from maleic anhydride is detected when the adhesive film for a metal terminal is analyzed by infrared spectroscopy.

6. The adhesive film for a metal terminal according to claim 1, wherein the resin layer having a polyolefin backbone includes a polypropylene layer.

7. The adhesive film for a metal terminal according to claim 6, wherein the polypropylene layer contains block polypropylene.

8. The adhesive film for a metal terminal according to claim 6, wherein the polypropylene layer contains random polypropylene.

9. The adhesive film for a metal terminal according to claim 6, wherein the polypropylene layer is formed of unstretched polypropylene.

10. The adhesive film for a metal terminal according to claim 6, wherein the polypropylene layer has a laminated configuration in which a layer formed of random polypropylene, a layer formed of block polypropylene, and a layer formed of random polypropylene are laminated in this order.

11. The adhesive film for a metal terminal according to claim 6, wherein the polypropylene layer has a sea-island structure when a cross-section is observed with an electron microscope, and a ratio of an area of island portions is 5% or more in the sea-island structure.

12. The adhesive film for a metal terminal according to claim 1, wherein the resin layer having a polyolefin backbone includes an acid-modified polypropylene layer.

13. The adhesive film for a metal terminal according to claim 12, wherein the acid-modified polypropylene layer includes random-based acid-modified polypropylene.

14. The adhesive film for a metal terminal according to claim 1, wherein the packaging material includes a laminated sheet including at least a base material layer, a barrier layer and a heat-sealable resin layer in this order, and the adhesive film for a metal terminal is interposed between the heat-sealable resin layer and the metal terminal.

15. The adhesive film for a metal terminal according to claim 1, wherein the resin layer includes at least one of a polypropylene layer and an acid-modified polypropylene layer, in which a sea-island structure is observed when a cross-section is observed with an electron microscope, and in the sea-island structure of the polypropylene layer or the acid-modified polypropylene layer, a ratio of an area of island portions is within a range of 10 to 50%.

16. A battery comprising at least a battery element including a positive electrode, a negative electrode and an electrolyte, a packaging material sealing the battery element, and a metal terminal which is electrically connected to each of the positive electrode and the negative electrode, and protrudes outside the packaging material, wherein the adhesive film for a metal terminal according to claim 1 is interposed between the metal terminal and the packaging material.

17. A metal terminal with an adhesive film, comprising a metal terminal, and the adhesive film for a metal terminal according to claim 1, which covers a part of the metal terminal.

* * * * *